United States Patent
Chen et al.

(10) Patent No.: US 9,826,522 B2
(45) Date of Patent: *Nov. 21, 2017

(54) BASE STATION AND DEVICE TO DEVICE USER EQUIPMENT FOR A WIRELESS COMMUNICATION SYSTEM

(71) Applicant: Institute For Information Industry, Taipei (TW)

(72) Inventors: Chiu-Wen Chen, Taipei (TW); Chun-Che Chien, Taipei (TW)

(73) Assignee: Institute For Information Industry, Taipei (TW)

( * ) Notice: Subject to any disclaimer, the term of this patent is extended or adjusted under 35 U.S.C. 154(b) by 290 days.

This patent is subject to a terminal disclaimer.

(21) Appl. No.: 14/609,380

(22) Filed: Jan. 29, 2015

(65) Prior Publication Data

US 2015/0223217 A1 Aug. 6, 2015

Related U.S. Application Data

(60) Provisional application No. 61/933,890, filed on Jan. 31, 2014.

(51) Int. Cl.
*H04W 72/04* (2009.01)
*H04W 72/00* (2009.01)
(Continued)

(52) U.S. Cl.
CPC ......... *H04W 72/044* (2013.01); *H04W 72/00* (2013.01); *H04W 24/00* (2013.01);
(Continued)

(58) Field of Classification Search
CPC .................................................. H04W 24/00
See application file for complete search history.

(56) References Cited

U.S. PATENT DOCUMENTS

2011/0106952 A1 5/2011 Doppler et al.
2013/0273926 A1* 10/2013 Peng ................. H04B 7/15528
455/450

(Continued)

FOREIGN PATENT DOCUMENTS

WO 2012159270 A1 11/2012

OTHER PUBLICATIONS

Extended European Search Report to the corresponding European Patent Application rendered by European Patent Office (EPO) on Jun. 11, 2015, 6 pages.

*Primary Examiner* — Mohammad Anwar
*Assistant Examiner* — Angel Brockman
(74) *Attorney, Agent, or Firm* — Skaar Ulbrich Macari, P.A.

(57) ABSTRACT

A base station and a device to device user equipment for a wireless communication system are provided. The wireless communication system defines a resource pool. The base station includes a storage, a processor and a transceiver. The storage stores signal quality information and traffic loading information. The processor chooses a plurality of resource blocks from the resource pool to form a device to device (D2D) resource pool according to at least one of the signal quality information and the loading information, and generates resource configuration information according to the D2D resource pool. The resource configuration information indicates the D2D resource pool. The transceiver transmits the resource configuration information.

21 Claims, 21 Drawing Sheets

(51) Int. Cl.
    *H04W 24/00*    (2009.01)
    *H04W 24/10*    (2009.01)
    *H04W 72/08*    (2009.01)
    *H04W 76/02*    (2009.01)

(52) U.S. Cl.
    CPC .......... *H04W 24/10* (2013.01); *H04W 72/042* (2013.01); *H04W 72/085* (2013.01); *H04W 76/023* (2013.01)

(56) References Cited

U.S. PATENT DOCUMENTS

| | | | |
|---|---|---|---|
| 2013/0308551 A1 | 11/2013 | Madan et al. | |
| 2014/0141789 A1* | 5/2014 | Tarokh .................. | H04W 72/02 455/450 |
| 2014/0160950 A1* | 6/2014 | Vasudevan ............ | H04W 36/00 370/252 |
| 2014/0206322 A1* | 7/2014 | Dimou .................. | H04W 4/005 455/414.1 |
| 2015/0092706 A1* | 4/2015 | Chen .................... | H04W 72/04 370/329 |

\* cited by examiner

BASE STATION AND DEVICE TO DEVICE USER EQUIPMENT FOR A WIRELESS COMMUNICATION SYSTEM

PRIORITY

This application claims the benefit of priority based on U.S. Provisional Application Ser. No. 61/933,890 filed on Jan. 31, 2014, which is hereby incorporated by reference in its entirety.

FIELD

The present invention relates to a base station and a device to device (D2D) user equipment (UE) for a wireless communication system. More particularly, the base station of the present invention chooses a plurality of resource blocks from a resource pool of the wireless communication system according to at least one of signal quality information and traffic loading information so as to provide the resource blocks for use by the D2D UE.

BACKGROUND

As the wireless communication technologies become mature in recent years, many kinds of wireless communication systems have been derived and applied to various occasions. In the public safety network architecture, in order to provide emergency communication services (e.g., to call the police, the fire station or the ambulance) or inter-group communication services, there are demands for direct communication between neighboring UEs to make the communications therebetween more efficient. However, all such demands for direct communication must be satisfied via specific UEs and specific spectrums.

The $3^{rd}$ Generation Partnership Project Long Term Evolution (3GPP LTE) communication system is a rapidest developing communication system recently, and UEs supporting the 3GPP LTE communication system have been gradually used in daily communications. In the 3GPP LTE communication system, the data transmission between UEs must be accomplished by using a base station and a core network as media, so it is required that the UEs be located in the signal coverage of the base station and the data transmission be carried out via resources allocated by the base station. If any of the UEs is not located in the signal coverage of the base station, it will be unable to get any allocated resources and, consequently, will be unable to communicate with other UEs. Additionally, since the existing 3GPP LTE communication system does not provide direct communication services between UEs, the 3GPP LTE communication system could not extend its resources to the public safety network.

Accordingly, an urgent need exists in the art to provide a resource allocation mechanism that can allocate appropriate resources of the 3GPP LTE network to UEs for direct communication.

SUMMARY

An objective of the present invention includes providing a base station and a device to device (D2D) user equipment (UE). The base station of the present invention dynamically allocates appropriate resources from the resource pool of the existing 3GPP LTE communication system according to at least one of signal quality information and traffic loading information to allow for direct communication among UEs. Accordingly, the present invention can extend application of the resources of the 3GPP LTE communication system to the Public safety Network.

To achieve the aforesaid objective, certain embodiments of the present invention include a base station for a wireless communication system. The wireless communication system defines a resource pool. The base station comprises a storage, a processor and a transceiver. The storage is configured to store signal quality information and traffic loading information. The processor is electrically connected to the storage and is configured to choose a plurality of resource blocks according to at least one of the signal quality information and the traffic loading information to form a D2D resource pool, and generate resource configuration information according to the D2D resource pool. The resource configuration information indicates the D2D resource pool. The transceiver is electrically connected to the processor and is configured to transmit the resource configuration information.

Additionally, to achieve the aforesaid objective, certain embodiments of the present invention include a D2D UE for a wireless communication system. The wireless communication system defines a resource pool. The D2D UE comprises a transceiver and a processor. The transceiver is configured to receive resource configuration information. The resource configuration information indicates a D2D resource pool. The D2D resource pool is formed by a base station through choosing a plurality of resource blocks from the resource pool according to at least one of signal quality information and traffic loading information, and the resource configuration information is generated by the base station according to the D2D resource pool. The processor is electrically connected to the transceiver and is configured to parse the resource configuration information to learn the D2D resource pool.

Furthermore, to achieve the aforesaid objective, certain embodiments of the present invention include a D2D UE for a wireless communication system. The wireless communication system defines a resource pool. The resource pool defines an uplink resource. The uplink resource comprises a D2D broadcast resource. The D2D UE comprises a transceiver and a processor. The transceiver is configured to receive additional resource configuration information from a first D2D UE via the D2D broadcast resource. The additional resource configuration information is generated by the first D2D UE according to resource configuration information. The resource configuration information indicates a D2D resource pool. The D2D resource pool is formed by a base station through choosing a plurality of resource blocks from the resource pool according to at least one of signal quality information and traffic loading information. The resource configuration information is generated by the base station according to the D2D resource pool and is transmitted to the first D2D UE via the D2D broadcast resource. The processor is electrically connected to the transceiver and is configured to parse the additional resource configuration information to learn the D2D resource pool.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to example embodiments thereof. The description includes a base station and a device to device (D2D) user equipment (UE). It shall be appreciated that these example embodiments are not intended to limit the present invention to any specific example, embodiment, environment, applications or particular implementations described in these example embodiments. Therefore, description of these example embodiments is only for purpose of illustration rather than to limit the present invention, and the scope of this application shall be governed by the claims.

In the following embodiments and the attached drawings, elements unrelated to the present invention are omitted from depiction; and dimensional relationships among individual elements in the attached drawings are illustrated only for ease of understanding, but not to limit the actual scale.

The base station and the D2D UE of the present invention are used for a wireless communication system to achieve a function of D2D direct communication. The wireless communication system involved in the present invention may be a wireless communication system conforming to the Long Term Evolution (LTE) specification or some other wireless communication system adopting, for example, the Orthogonal Frequency Division Multiplexing Access (OFDMA) specification.

Figure 1:
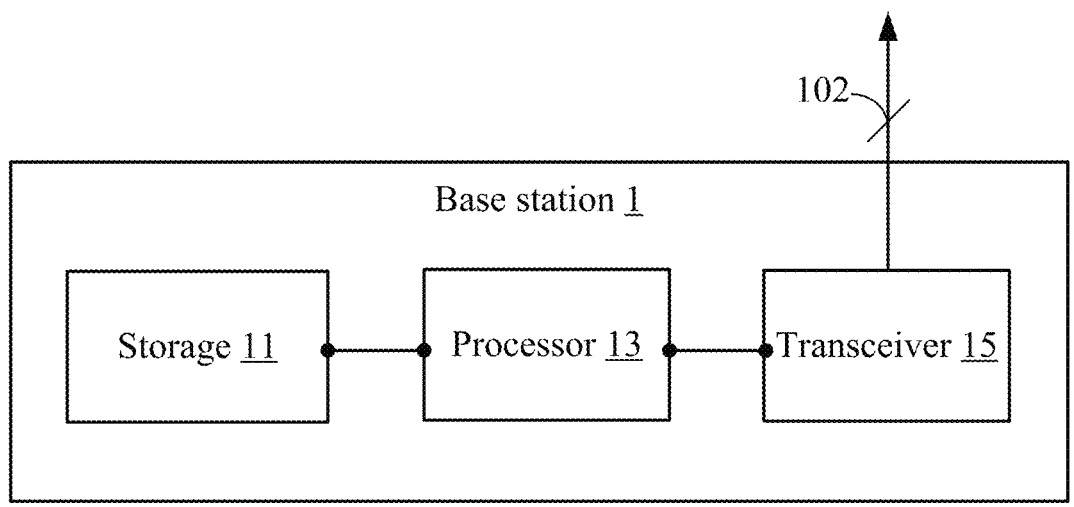
FIG. 1 is a schematic view of a base station 1 according to a first embodiment of the present invention.
Figure 2A:
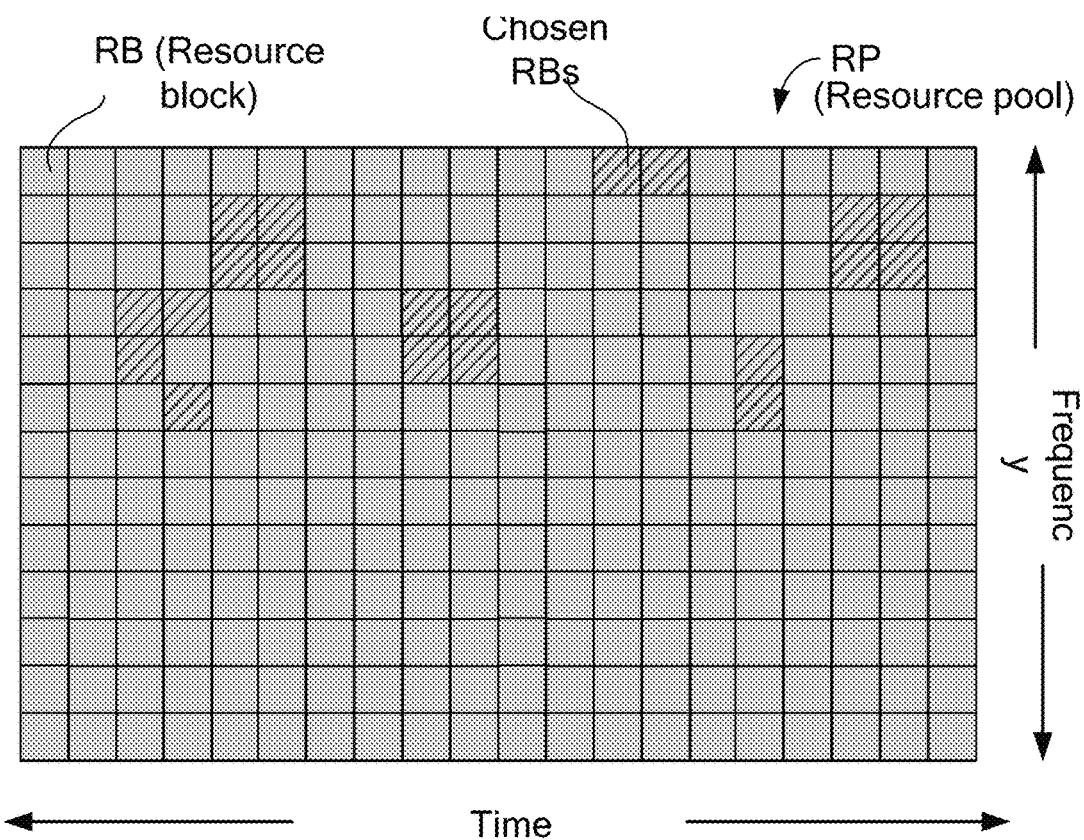
FIG. 2A depicts an example of a resource pool RP and a plurality of resource blocks (RBs) comprised therein according to the present invention.
Figure 2B:
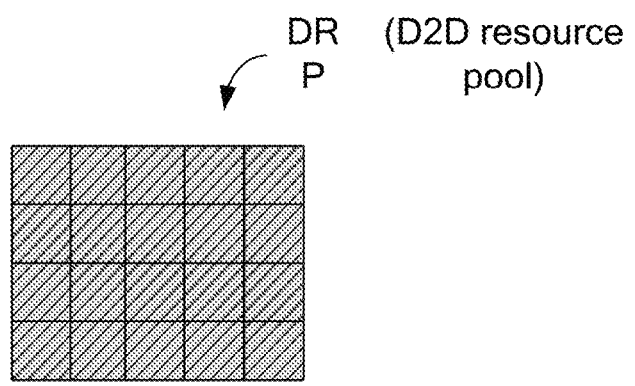
FIG. 2B depicts an example of a D2D resource pool DRP according to the present invention.

Please refer to FIG. 1, FIG. 2A and FIG. 2B for a first embodiment of the present invention. FIG. 1 is a schematic view of a base station 1 of the present invention. The base station 1 comprises a storage 11, a processor 13 and a transceiver 15. In this embodiment, the base station 1 is an LTE wireless communication system, and defines a resource pool RP. As shown in FIG. 2A, the resource pool RP is radio resources consisting of specific frequency interval and time interval and comprises a plurality of resource blocks (RB).

The storage 11 is configured to store signal quality information and traffic loading information. For example, the signal quality information may include a signal interference strength, a signal receiving strength or the like information of each D2D UE within the signal coverage of the base station 1 with respect to the resource pool RP, and the traffic loading information may be a current utilization ratio (i.e., the number of resources that have been allocated to cellular UEs for use) of the resource pool. It should be appreciated that, in the present invention, the D2D UEs are UEs that support both the LTE wireless communication and the D2D wireless communication, while the cellular UEs are UEs that only support the LTE wireless communication.

In a practical example, the D2D UE can obtain the signal interference strength, the signal receiving strength or the like information with respect to the resource pool RP by a measurement procedure, and generate and transmit a measurement report message to the base station 1. In this case, the transceiver 15 receives the measurement report message so that the processor 13 can generate signal quality information according to the measurement report message and store the signal quality information into the storage 11. Additionally, in another practical example, because both the LTE UEs and the D2D UEs within the signal coverage of the base station 1 perform a connection procedure with the base station 1, the processor 13 may generate the signal quality information according to signal properties (e.g., the receiving signal strengths, the signal interference strengths and the receiving signal orientations or the like) of the D2D UEs and the cellular UEs in the connection procedure. In other words, the base station 1 may generate the signal quality information based on signal measurement results of the D2D UEs and/or a signal measurement result of the base station 1 itself.

Based on at least one of the signal quality information and the traffic loading information, the processor 13 can dynamically choose a plurality of resource blocks from the resource pool RP to form a D2D resource pool DRP (i.e., as shown in FIG. 2A and FIG. 2B). Specifically, according to the signal quality information, the base station 1 can learn which resource blocks in the resource pool RP currently have relatively low interference levels and preferred receiving signal strengths with respect to the D2D UEs so as to avoid that resource blocks having high interference levels or serious signal fading are chosen. In this way, the base station 1 can choose a predetermined number of resource blocks according to the signal quality information to form the D2D resource pool DRP. Furthermore, depending on the current load state of itself, the base station 1 can, further according to the traffic loading information, dynamically decide the number of resource blocks to be chosen to form the D2D resource pool DRP. Additionally, the base station 1 may also choose the specific number of resource blocks according to only the traffic loading information to form the D2D resource pool DRP.

Further speaking, in this embodiment, the base station 1 dynamically chooses the resource blocks from the resource pool RP according to at least one of the signal quality information and the traffic loading information for use by non-specific D2D UEs within the signal coverage thereof. However, in other embodiments, the processor 13 may further choose some fixed resource blocks from the resource pool RP for use by the specific D2D UEs. In this case, the processor 13 defines a dynamic resource block set and at least one fixed resource block set in the D2D resource pool DRP. The dynamic resource block set is for use by the non-specific D2D UEs, while the fixed resource block set is for use by the specific D2D UEs. Herein, the specific D2D UEs may be D2D UEs with high speed mobility or with a specific application (e.g., an emergency communication application). Additionally, in another embodiment, the processor 13 may define a plurality of group resource block sets in the resource pool DRP, or define that the dynamic resource block set and/or the fixed resource block set comprise(s) a plurality of group resource block sets for use by D2D UEs in a group.

It should be appreciated that, the resource pool RP comprises an uplink resource and a downlink resource, and in general practices, the processor 13 usually chooses the resource blocks from the uplink resource. However, choosing the resource blocks from the uplink resource, the downlink resource or a combination thereof to form the D2D resource pool all fall within the scope of the present invention. After having decided the D2D resource pool, the processor 13 generates resource configuration information 102 according to the D2D resource pool DRP. The resource configuration information 102 is configured to indicate the D2D resource pool DRP. Next, the processor 13 transmits the resource configuration information 102 via the transceiver 15. In this way, a D2D UE receiving the resource configuration information 102 can learn the D2D resource pool DRP according to the resource configuration information 102, or further learn the dynamic resource block set, the at least one fixed resource block set and the group resource block sets that are defined.

In other embodiments, when the base station 1 recognizes that a D2D UE within the signal coverage thereof is likely to perform a D2D data transmission with a D2D UE within a signal coverage of a neighboring base station, the base station 1 firstly performs a negotiation procedure with the neighboring base station via a backhaul network to further choose the resource blocks from the resource pool RP according to the negotiation procedure. In this way, the resource blocks of the D2D resource pool DRP of the base station 1 may be identical to or partly identical to the resource blocks of the neighboring D2D resource pool of the neighboring base station.

Specifically, the processor 13 enables the transceiver 15 to transmit the information of the resource blocks chosen by the base station 1 to the neighboring base station and also to receive the information of the resource blocks chosen by the neighboring base station from the neighboring base station. Because there may be priorities (e.g., the base station with a smaller serial number has a higher priority) between the base station 1 and the neighboring base station, the two base stations may, according to the priorities, decide to use the resource blocks chosen by the base station having the higher priority or to change the chosen resource blocks according to the resource blocks chosen by the base station having the higher priority so as to make the resource blocks finally decided by the two base stations partly identical to each other.

For example, when the processor 13 recognizes that the base station serial number of the neighboring base station is smaller than the base station serial number of itself, the processor 13 discards the resource blocks originally chosen and uses the resource blocks chosen by the neighboring base station to form the D2D resource pool DRP instead, or changes a part of the chosen resource blocks to make one or more resource blocks identical to the resource blocks chosen by the neighboring base station.

Figure 3A:
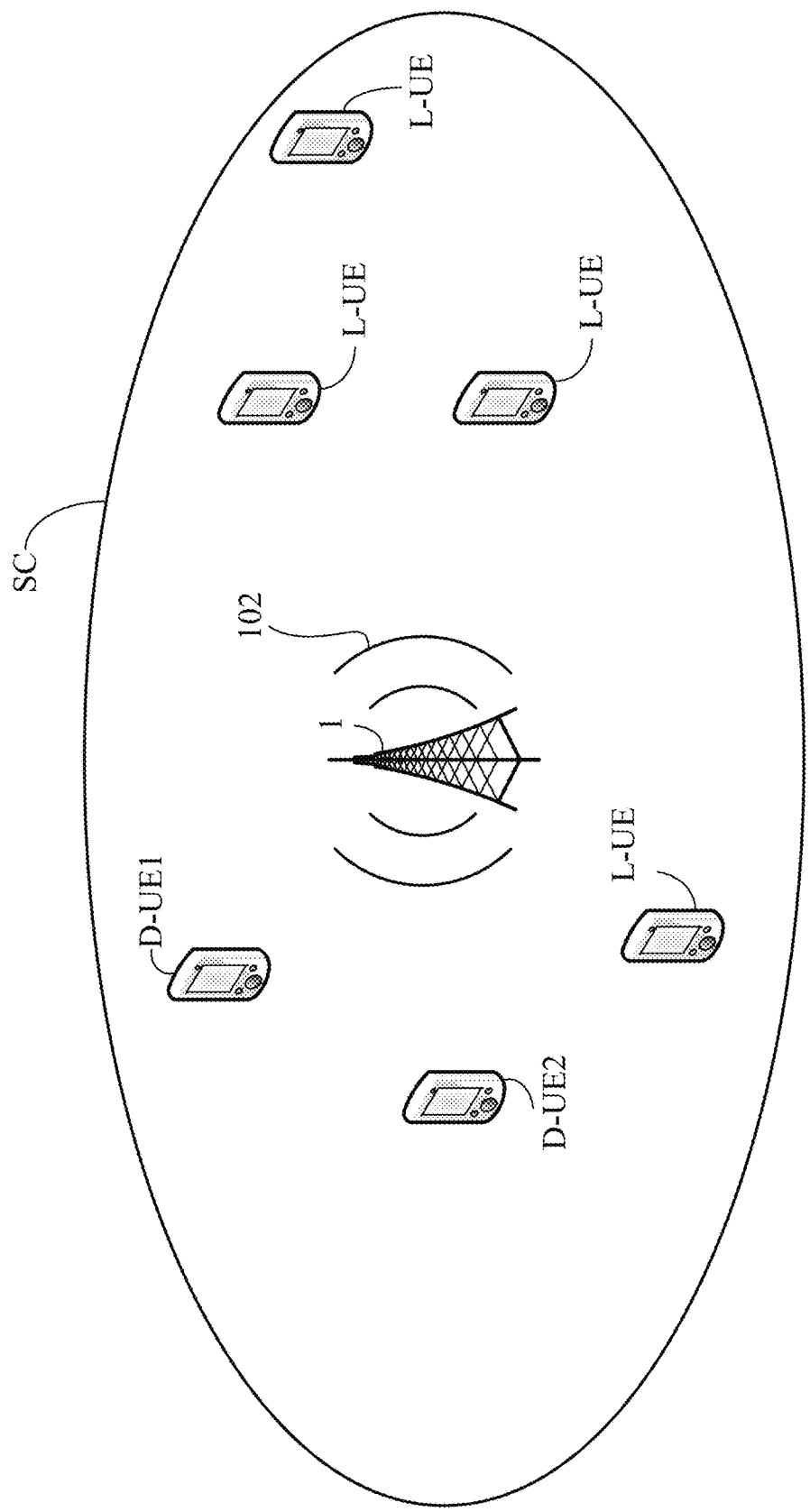
FIGS. 3A~3C respectively depict cases in which resource configuration information is transmitted between the base station 1 and D2D UEs according to a second embodiment of the present invention.
Figure 3B:
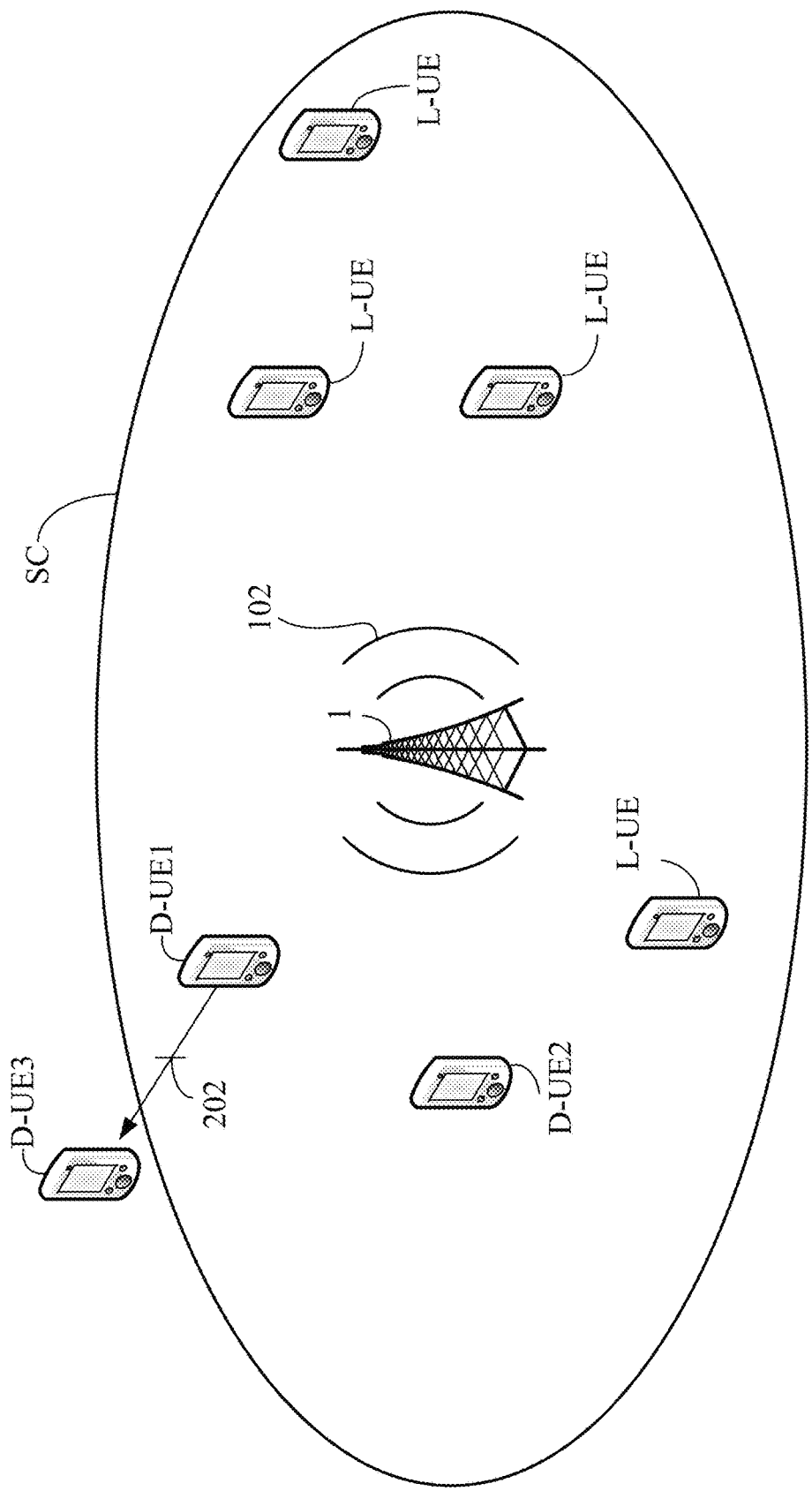
Figure 3C:
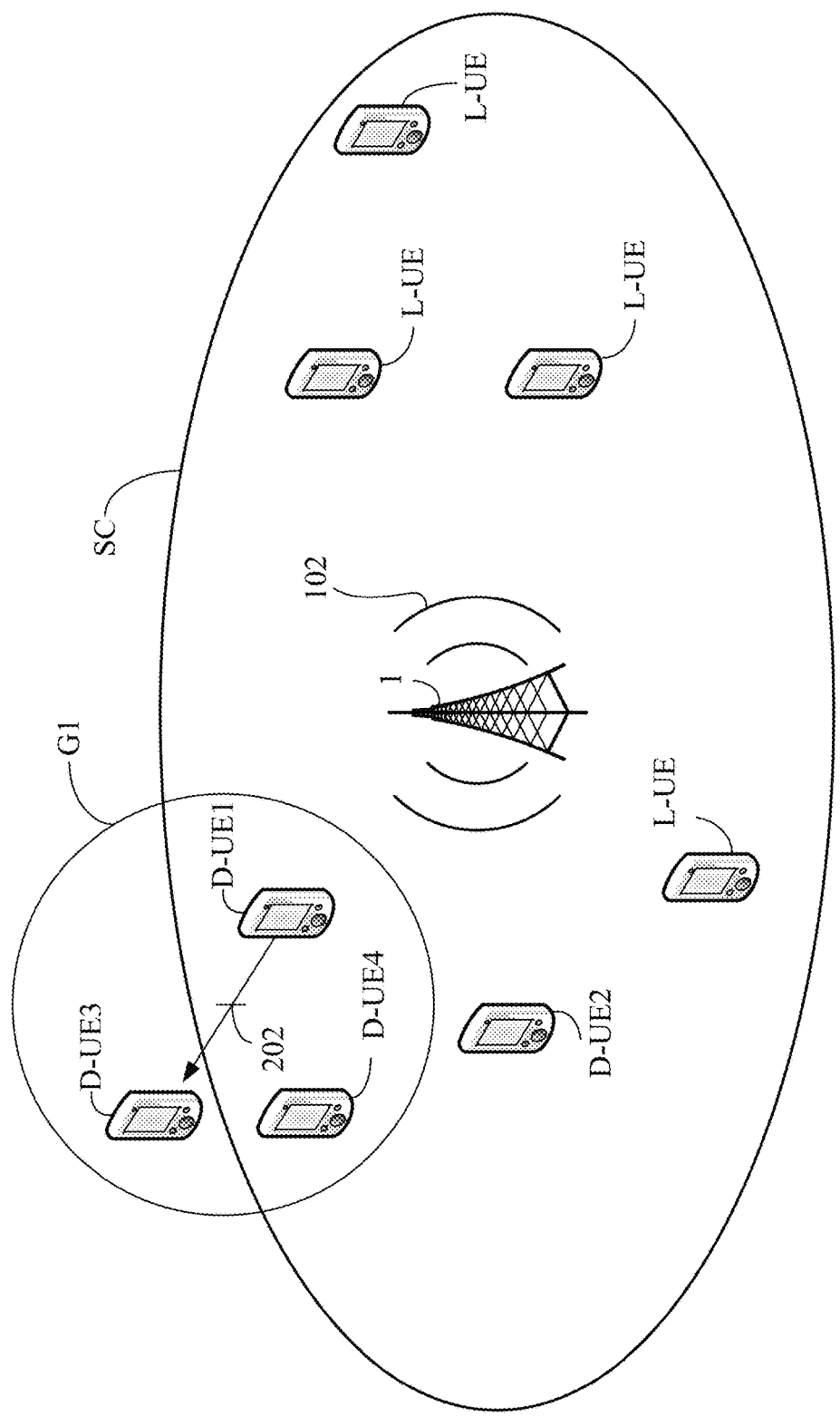

Please refer to FIGS. 3A~3C for a second embodiment of the present invention. FIGS. 3A~3C respectively depict cases in which resource configuration information is transmitted between the base station 1 and the D2D UEs. In this embodiment, the base station 1 transmits the resource configuration information by broadcast. Specifically, the processor 13 has the resource configuration information carried in a broadcast resource (e.g., a master information block (MIB), a system information block (SIB), a primary synchronization signal (PSS), or a secondary synchronization signal (SSS)) of the downlink resource.

In detail, when the resource configuration information is transmitted via the MIB or the SIB, the MIB or the SIB carries complete information of the D2D resource pool DRP. However, when the resource configuration information is transmitted via the PSS or the SSS, there exists a mapping rule that allows the D2D UE to obtain the information of the D2D resource pool DRP according to a specific sequence of the PSS or the SSS and according to the mapping rule. In other words, in this case, the resource blocks chosen from the resource pool RP of the base station 1 are one of a plurality of predetermined groups of resource blocks, and each group of resource blocks maps to a specific sequence of the PSS or the SSS. Accordingly, in a case where both the base station 1 and the D2D UE store these information including the mapping rule, the sequences of the PSS or the SSS and the groups of resource blocks, the base station 1 can transmit the resource configuration information to the D2D UE via the PSS or the SSS.

Additionally, when the resource configuration information is transmitted via the MIB or the SIB, there may also exit a mapping rule that allows the D2D UE to obtain the information of the D2D resource pool DRP according to specific information carried in the MIB or the SIB and according to the mapping rule. In other words, in a case where both the base station 1 and the D2D UE store these information including the mapping rule, the specific information and the groups of resource blocks, the base station 1 can transmit the resource configuration information to the D2D UE through carrying the specific information in the MIB or the SIB. In this way, the MIB or the SIB may not need to carry the complete information of the D2D resource pool DRP, thus reducing the amount of information carried.

In a case depicted in FIG. 3A, the D2D UEs D-UE1, D-UE2 and a plurality of cellular UEs L-UE are located within the signal coverage SC of the base station 1. Because the D2D UEs D-UE1 and D-UE2 are both within the signal coverage SC of the base station 1, they can receive the resource configuration information 102 from the base station 1 directly (i.e., they can retrieve the resource configuration information 102 from the broadcast resource of the downlink resource).

In a case depicted in FIG. 3B, the D2D UE D-UE3 is located outside of the signal coverage SC, and the D2D UE D-UE1 is the D2D UE that is the closest to the D2D UE D-UE3 and located within the signal coverage SC. In this case, after receiving the resource configuration information 102, the D2D UE D-UE1 generates additional resource configuration information 202 according to the resource configuration information 102. Then, the D2D UE D-UE1 transmits the additional resource configuration information 202 to the D2D UE D-UE3 via the D2D broadcast resource of the uplink resource.

It should be appreciated that, the broadcast resource and the D2D broadcast resource are respectively in advance of the specific resources defined by the downlink resource and the uplink resource, and are respectively used for the base station 1 and the D2D UE to broadcast the specific information. Herein, the D2D broadcast resource may be a primary device to device synchronization signal (PD2DSS), a secondary device to device synchronization signal (SD2DSS), a physical device to device broadcast channel (PD2DBCH) or a physical device to device synchronization channel (PD2DSCH). Likewise, when the additional resource configuration information 202 is transmitted via the PD2DBCH or the PD2DSCH, the PD2DBCH or the PD2DSCH carries the complete information of the D2D resource pool DRP. However, when the additional resource configuration information 202 is transmitted via the PD2DSS or the SD2DSS, there also exists a mapping rule that allows the D2D UE to obtain the information of D2D resource pool DRP according to the specific sequence of the PD2DSS or the SD2DSS and according to the mapping rule.

Furthermore, when the additional resource configuration information is transmitted via the PD2DBCH or the PD2DSCH, there may also exist a mapping rule that allows the D2D UE to obtain the information of D2D resource pool DRP according to the specific information carried by the PD2DBCH or the PD2DSCH and according to the mapping rule. In this way, the PD2DBCH or the PD2DSCH may not need to carry the complete information of the D2D resource pool DRP, thus reducing the amount of information carried.

In a case depicted in FIG. 3C, there exists a D2D group G1. The D2D group G1 comprises the D2D UEs D-UE1, D-UE3 and D-UE4, and the D2D UE D-UE3 is located outside of the signal coverage SC of the base station 1. Furthermore, the D2D UE D-UE1 acts as a coordinator. In this case, after receiving the resource configuration information 102, the D2D UE D-UE1 generates additional resource configuration information 202 according to the resource configuration information 102. Afterwards, the additional resource configuration information 202 is transmitted by the D2D UE D-UE1 to the D2D UE D-UE3 via the D2D broadcast resource of the uplink resource.

Figure 4A:
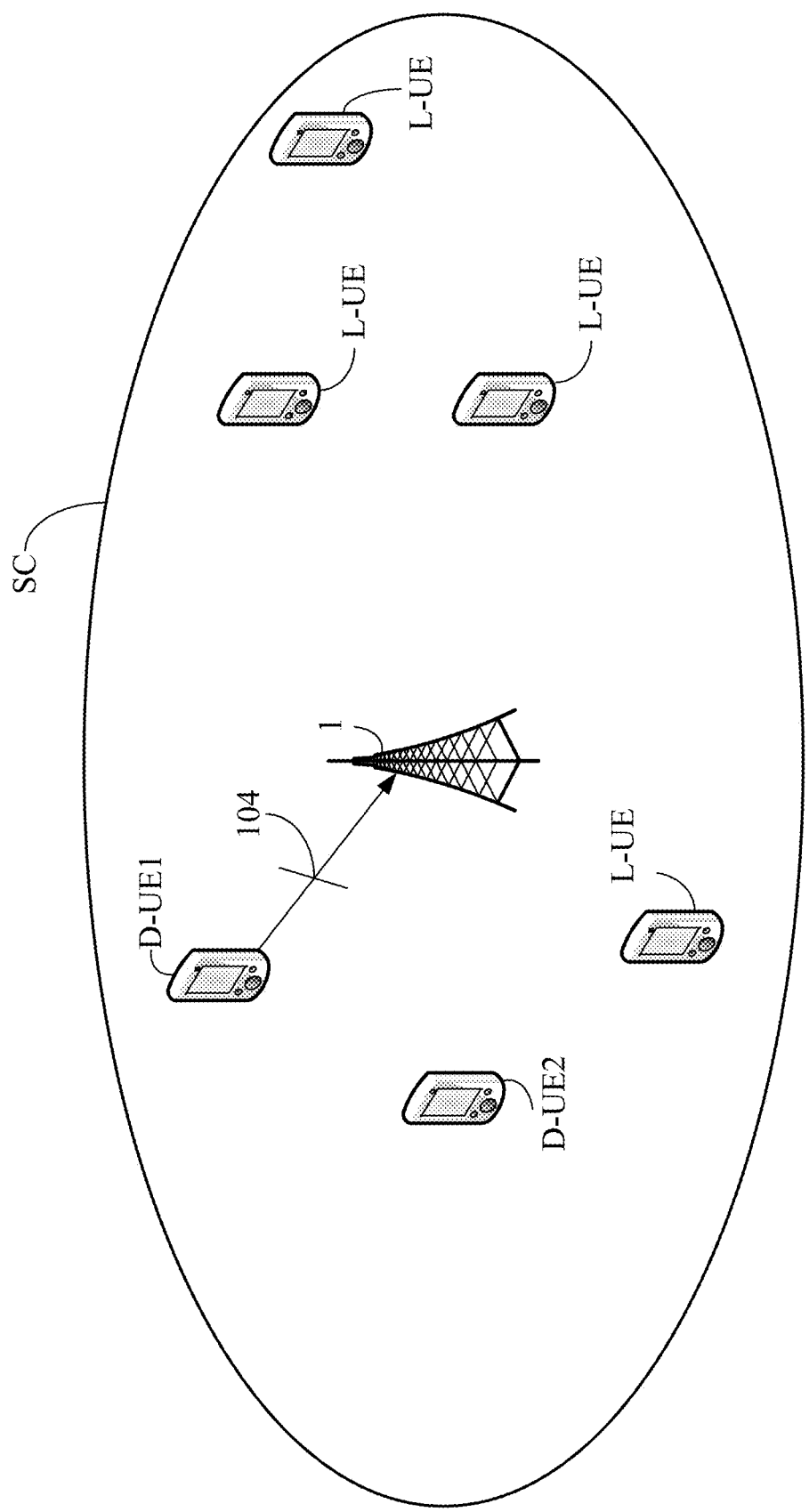
FIGS. 4A~4C respectively depict cases in which a resource request message is transmitted between the base station 1 and D2D UEs according to a third embodiment of the present invention.
Figure 4B:
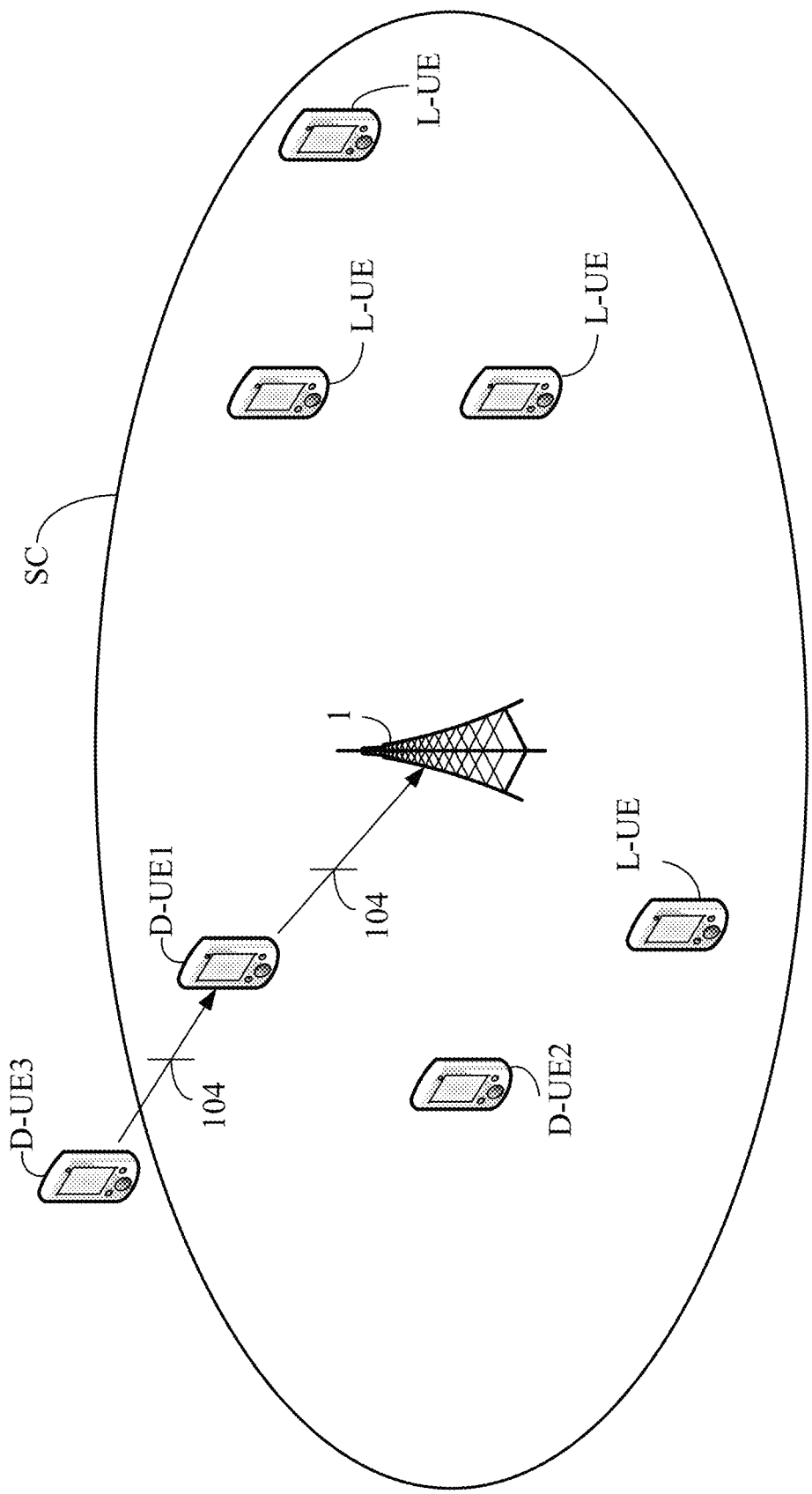
Figure 4C:
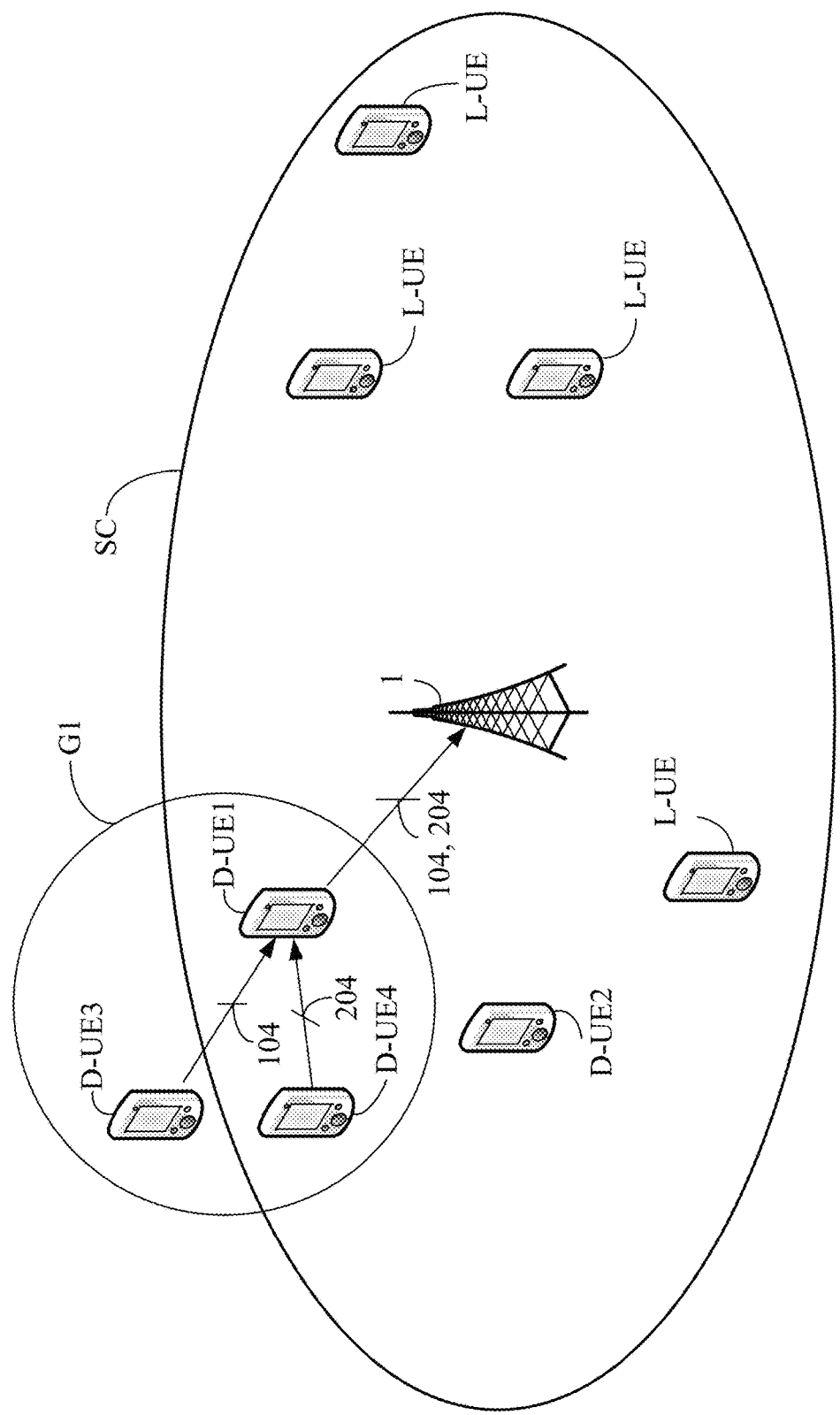

Please refer to FIGS. 4A~4C for a third embodiment of the present invention. FIGS. 4A~4C respectively depict cases in which a resource request message is transmitted between the base station 1 and the D2D UEs. In this embodiment, the D2D resource pool DRP defines a transmission request resource, and the transceiver 15 receives the resource request message from one or more D2D UEs via the transmission request resource. Specifically, after receiving the resource configuration information 102 or the additional resource configuration information 202 and learning the D2D resource pool DRP, the D2D UE transmits the resource request message to the base station 1 via the transmission request resource of the D2D resource pool DRP or transmits the resource request message to another D2D UE via the transmission request resource of the D2D resource pool DRP so as to transmit the resource request message to the base station 1 via another D2D UE.

It should be appreciated that, after the resource blocks are chosen by the base station 1 to form the D2D resource pool DRP, the transmission request resource is further defined for the D2D UEs to transmit the resource request message. Furthermore, the transmission request resource may be located in a specific region of the D2D resource pool DRP, and may be divided into a plurality of sub-resources for use by D2D UEs having different transmission demands. For example, the transmission request resource may be divided into three sub-resources: one sub-resource is for use by a general D2D UE, one sub-resource is for use by a D2D UE having a demand for high speed mobility, and one sub-resource is for use by a D2D UE having a demand for a specific application (e.g., an emergency communication application). Additionally, the three sub-resources may also be distributed in different resource block sets, for example, in the dynamic resource block set and the at least one fixed resource block set described previously. Accordingly, by transmitting the resource request message via different sub-resources in the transmission request resource, the base station 1 can learn the purpose of the D2D data transmission requested by the D2D UE so as to allocate appropriate resource blocks for the D2D UE to perform the D2D data transmission.

In a case depicted in FIG. 4A, when the D2D UE D-UE1 has a demand for D2D data transmission, the D2D UE D-UE1 transmits the resource request message 104 to the base station 1 via the transmission request resource. In a case depicted in FIG. 4B, the D2D UE D-UE3 is located outside of the signal coverage SC, and the D2D UE D-UE1 is the D2D UE that is the closest to the D2D UE D-UE3 and located within the signal coverage SC. In this case, the D2D UE D-UE3 transmits the resource request message 104 to the D2D UE D-UE1 via the transmission request resource, and then the D2D UE D-UE1 relays the resource request message 104 to the base station 1 via the transmission request resource.

In a case depicted in FIG. 4C, there exists a D2D group G1. The D2D group G1 comprises D2D UEs D-UE1, D-UE3, and D-UE4, and the D2D UE D-UE3 is located outside of the signal coverage SC of the base station 1. Furthermore, the D2D UE D-UE1 acts as a coordinator. In this case, the D2D UE D-UE3 transmits the resource request message 104 to the D2D UE D-UE1 via the transmission request resource, and then the D2D UE D-UE1 relays the resource request message 104 to the base station 1 via the transmission request resource. Likewise, in the case where there exists the D2D group G1, when the D2D UE D-UE4 has a demand for D2D data transmission, the D2D UE D-UE4 also transmits a resource request message 204 via the transmission request resource, and then the D2D UE D-UE1 relays the resource request message 204 to the base station 1 via the transmission request resource. Furthermore, the D2D UE D-UE1 may also integrate the resource request message 104 and the resource request message 204 firstly before then transmitting them to the base station 1.

In detail, in a case where there exists a D2D group, a D2D UE having a demand for D2D data transmission may firstly transmit the resource request message to the neighboring D2D UE that acts as a coordinator at a low transmission power via the transmission request resource, thus reducing the interference generated when different UEs send signals. Furthermore, when the D2D resource pool DRP is defined to include a plurality of group resource block sets, or when the dynamic resource block set and/or the fixed resource block set are/is further defined to include a plurality of group resource block sets, the D2D UEs in the D2D groups may transmit the resource request message to the D2D UE that acts as the coordinator via the transmission request resources of different group resource block sets depending on distances from the D2D UE that acts as the coordinator. In this way, it can be avoided that all the D2D UEs in a same D2D group contend for the same transmission request resource to transmit the resource request message.

Please refer to FIGS. 5A~5H for a fourth embodiment of the present invention. FIGS. 5A~5H respectively depict cases in which resource allocation information is transmitted between the base station 1 and the D2D UEs. In this embodiment, the D2D resource pool DRP defines an allocation notification resource. After the transceiver 15 receives at least one resource request message from at least one D2D UE via the transmission request resource, the processor 13 divides the D2D resource pool DRP into a plurality of D2D resource block sets according to at least one resource request message and generates resource allocation information. The resource allocation information is configured to indicate the D2D resource block sets. Afterwards, the transceiver further transmits the resource allocation information to at least one D2D UE via the allocation notification resource.

It should be appreciated that, in this embodiment, the D2D resource block sets may be distributed in the dynamic resource block set and the at least one fixed resource block set described previously; that is, the D2D resource block sets may be a subset of the dynamic resource block set and the at least one fixed resource block set. In other words, the processor 13 allocates appropriate resource blocks to the D2D UEs having various demands according to the resource request message. Furthermore, if the D2D UE has a demand for D2D data transmission with a D2D UE located within the signal coverage of the neighboring base station 1, the base station 1 also allocates resource blocks identical to those of the neighboring base station to this D2D UE for use.

Figure 5A:
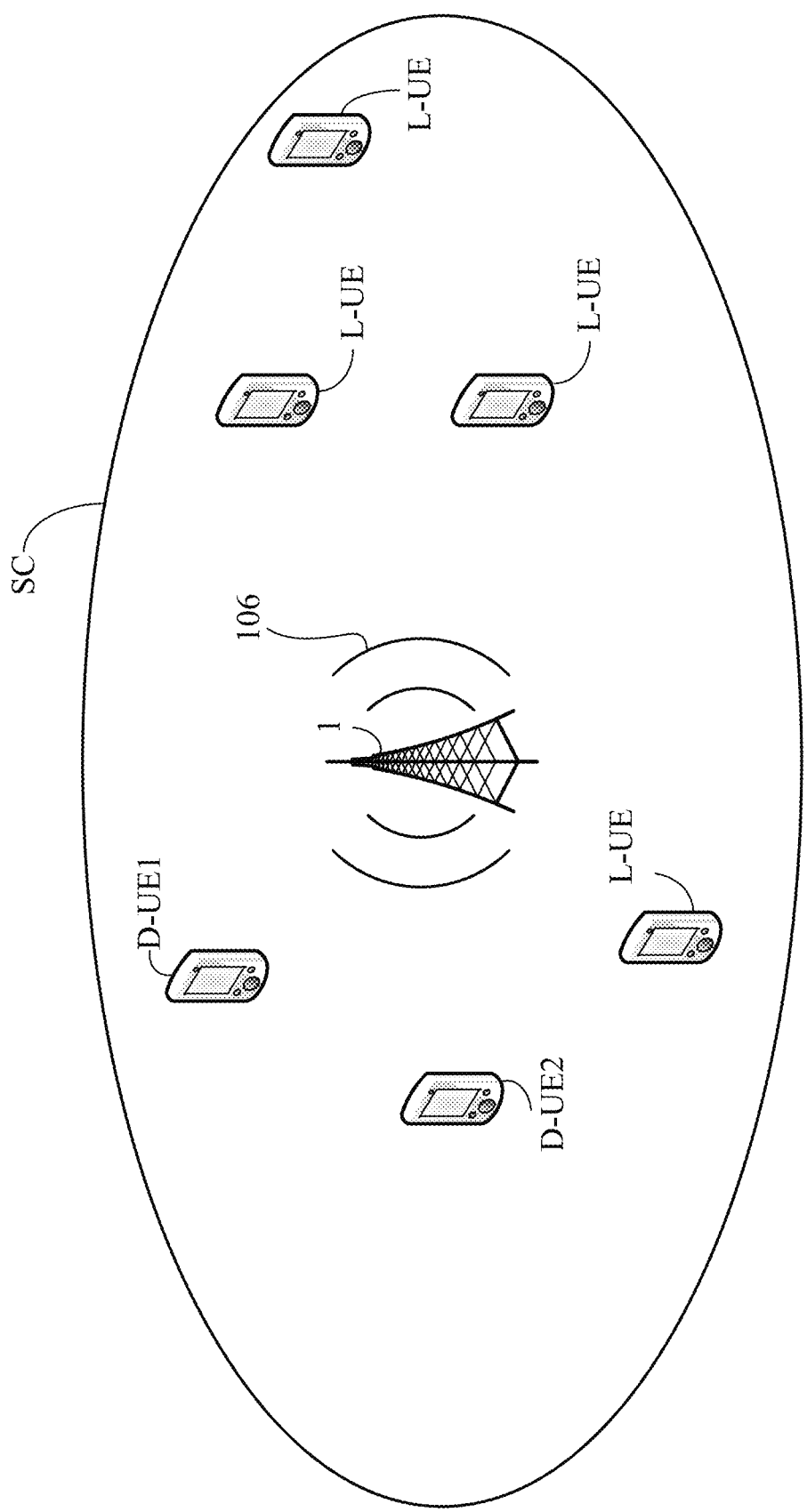
FIGS. 5A~5H respectively depict cases in which resource allocation information is transmitted between the base station 1 and D2D UEs according to a fourth embodiment of the present invention.
Figure 5B:
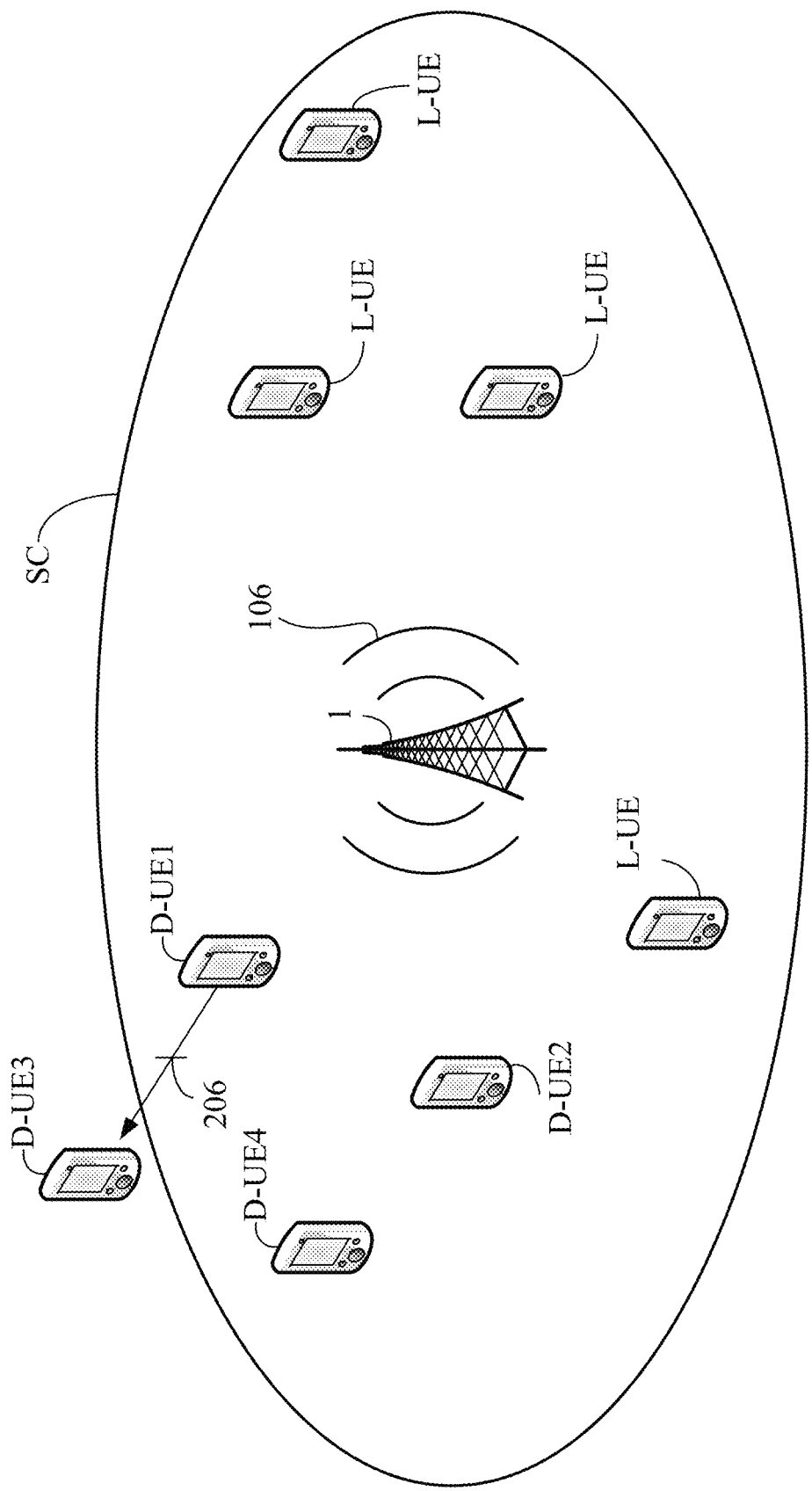

In a case depicted in FIG. 5A, the base station 1 transmits the resource allocation information 106 via the allocation notification resource by broadcast. In a case depicted in FIG. 5B, the D2D UE D-UE3 is located outside of the signal coverage SC, and the D2D UE D-UE1 is the D2D UE that is the closest to the D2D UE D-UE3 and located within the signal coverage SC. In this case, after receiving the resource allocation information 106, the D2D UE D-UE1 generates additional resource allocation information 206 and transmits the additional resource allocation information 206 to the D2D UE D-UE3 via the allocation notification resource. Herein, the additional resource allocation information 206 is also configured to indicate the D2D resource block sets.

Figure 5C:
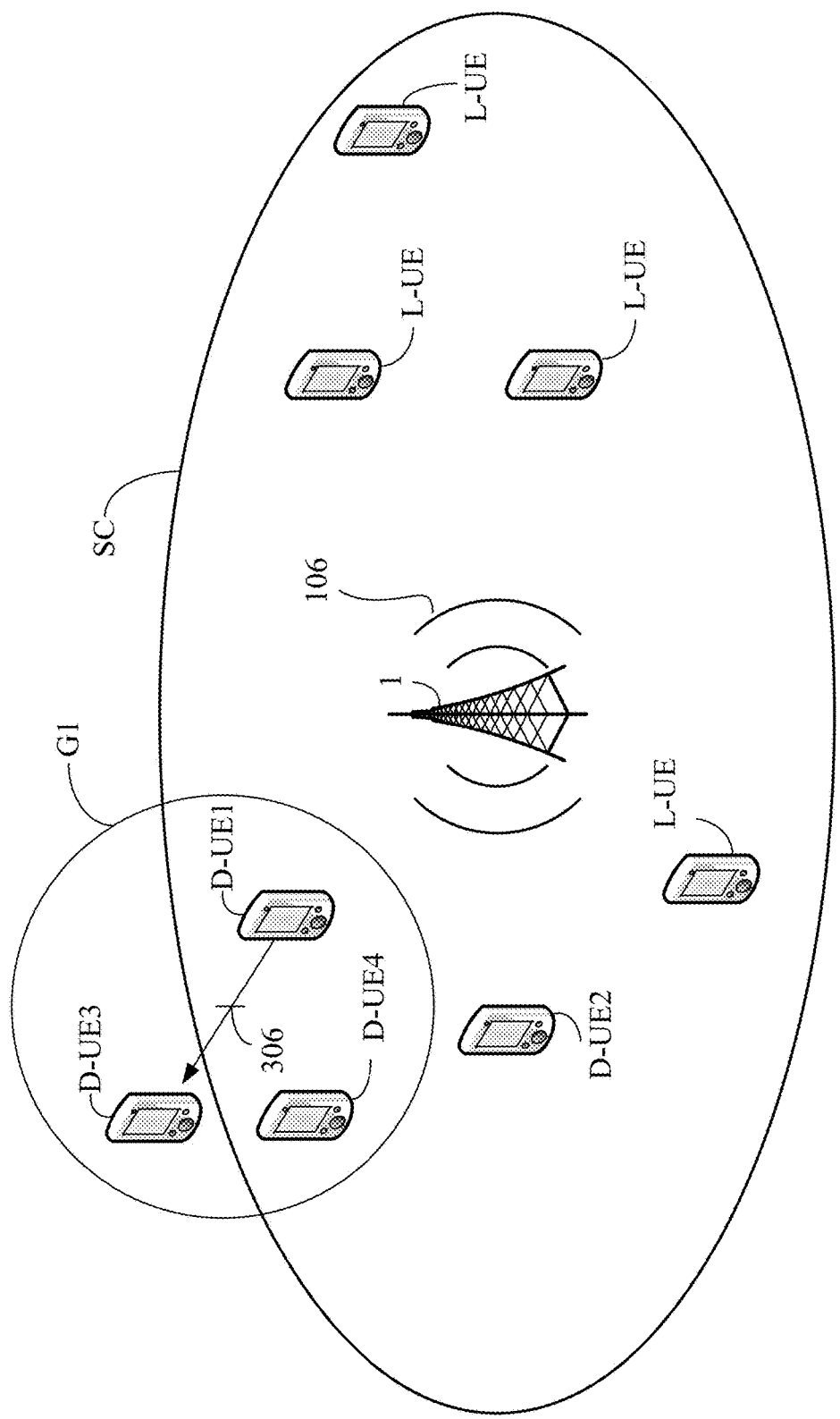

In a case depicted in FIG. 5C, there exists a D2D group G1, which comprises D2D UEs D-UE1, D-UE3, and D-UE4, and the D2D UE D-UE3 is located outside of the signal coverage SC of the base station 1. Furthermore, the D2D UE DUE-1 acts as a coordinator. In this case, after receiving the resource allocation information 106, the D2D UE D-UE1 generates additional resource allocation information 306 and transmits the additional resource allocation information 306 to the D2D UE D-UE3 via the allocation notification resource. Herein, the additional resource allocation information 306 is also configured to indicate the D2D resource block sets. However, in the case where there exits a D2D group G1, the base station 1 may allocate a D2D resource block set comprising a plurality of resource blocks to the D2D UE in the D2D group G1 for use, so the D2D UE D-UE1 acting as a coordinator may further allocate the resource blocks in the D2D resource block set to specific D2D UEs in the D2D group G1 for use. Accordingly, the additional resource allocation information 306 may further include group resource allocation information used for the D2D group G1.

Figure 5D:
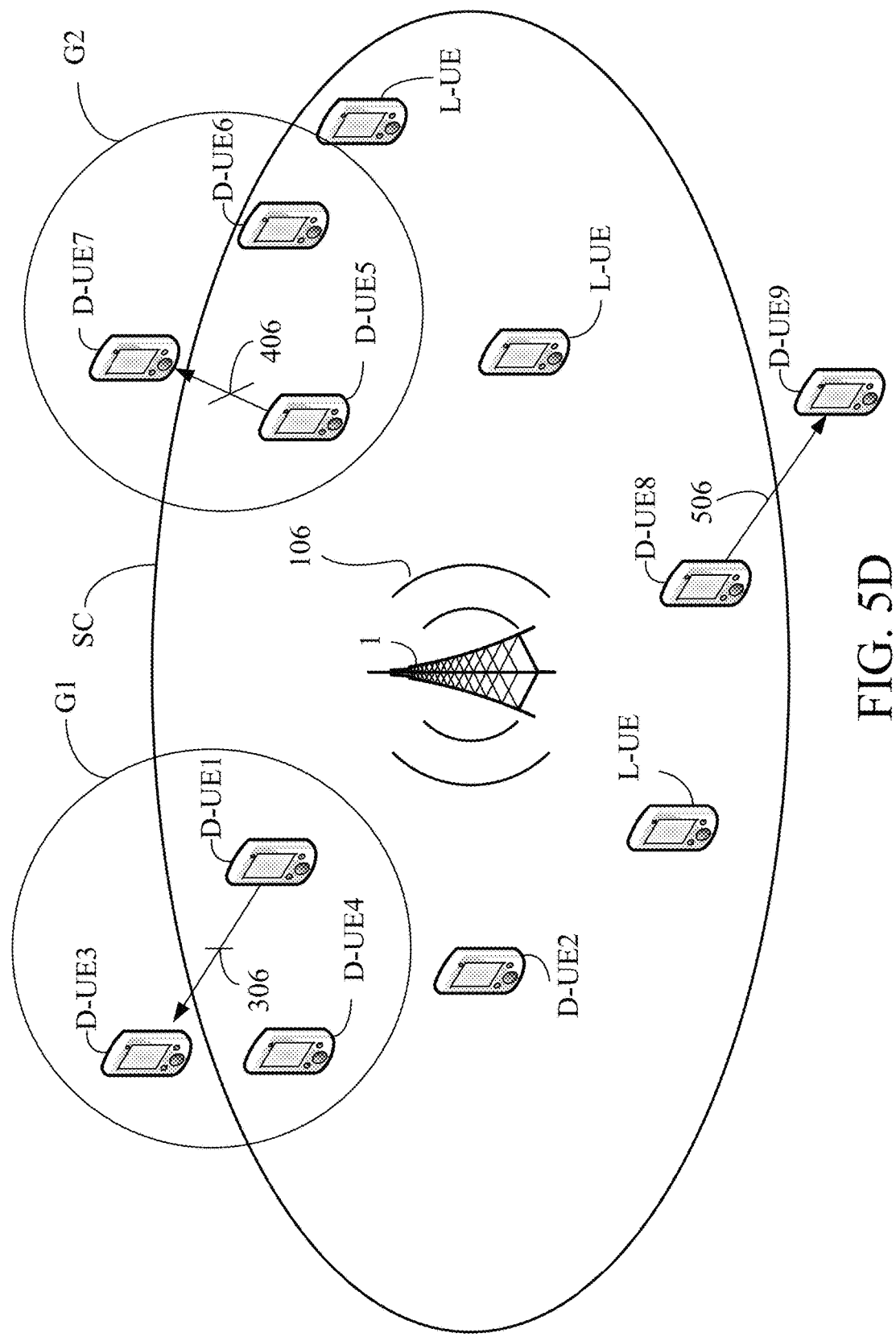
Figure 5E:
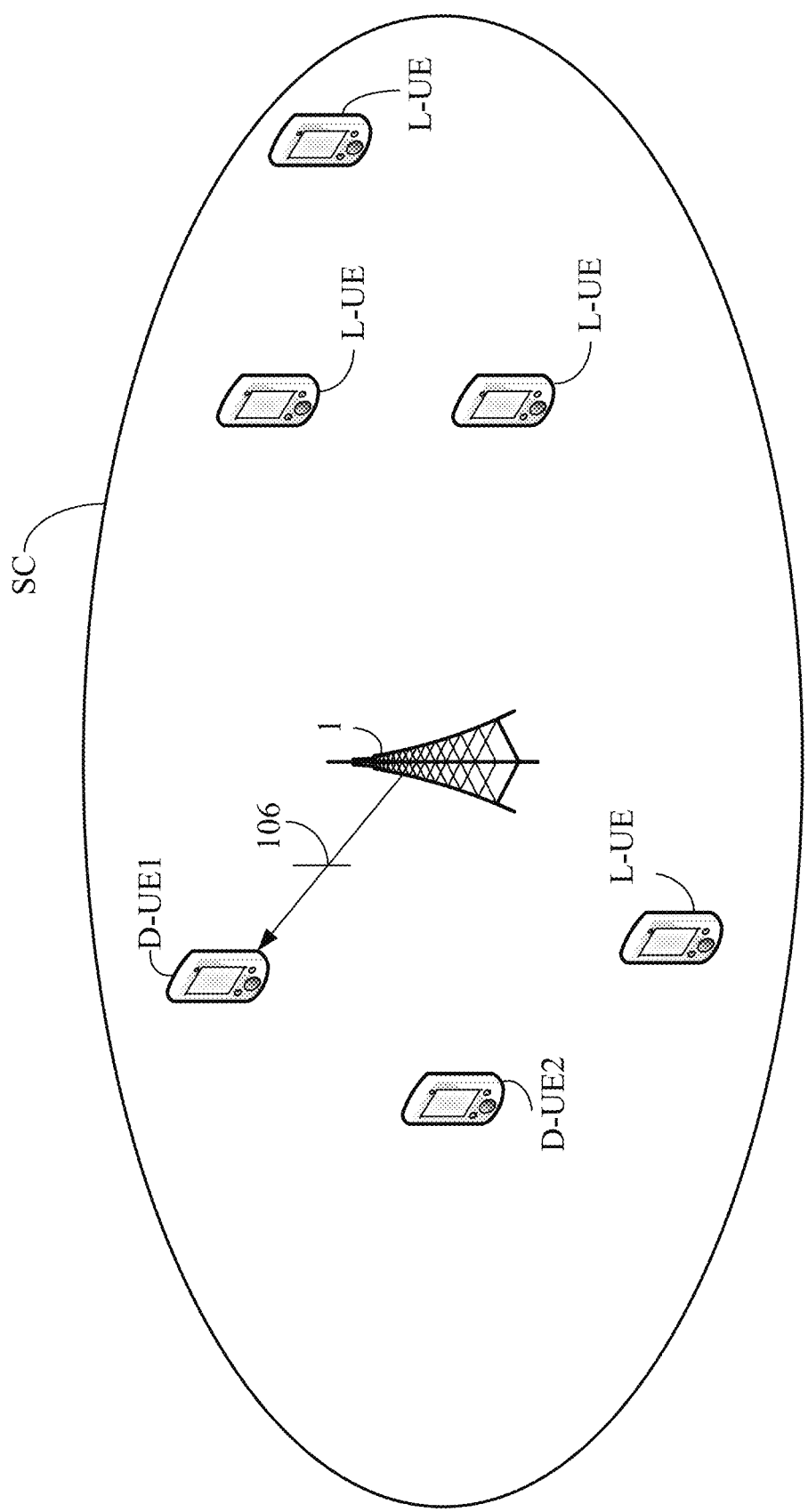
Figure 5F:
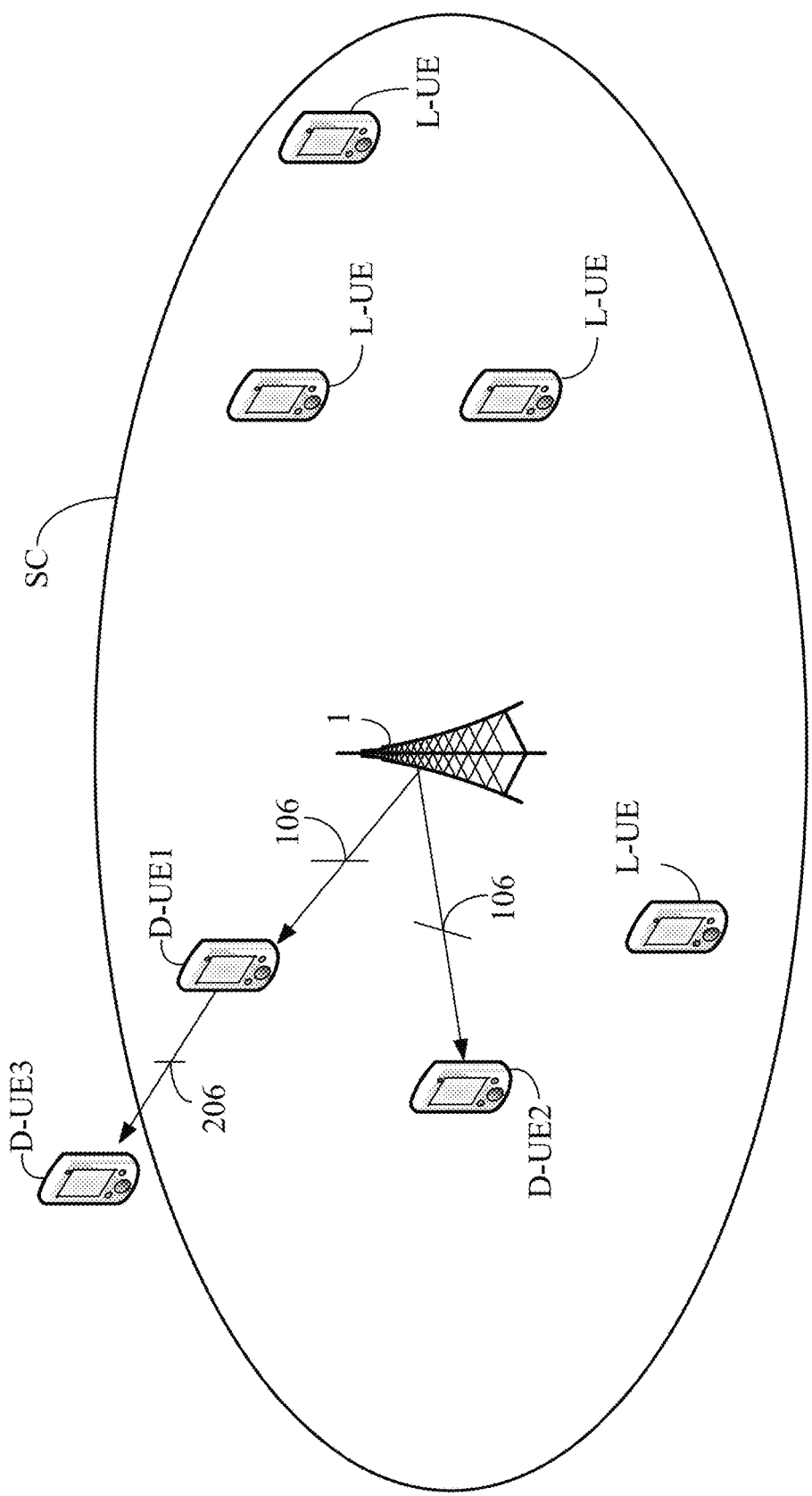
Figure 5G:
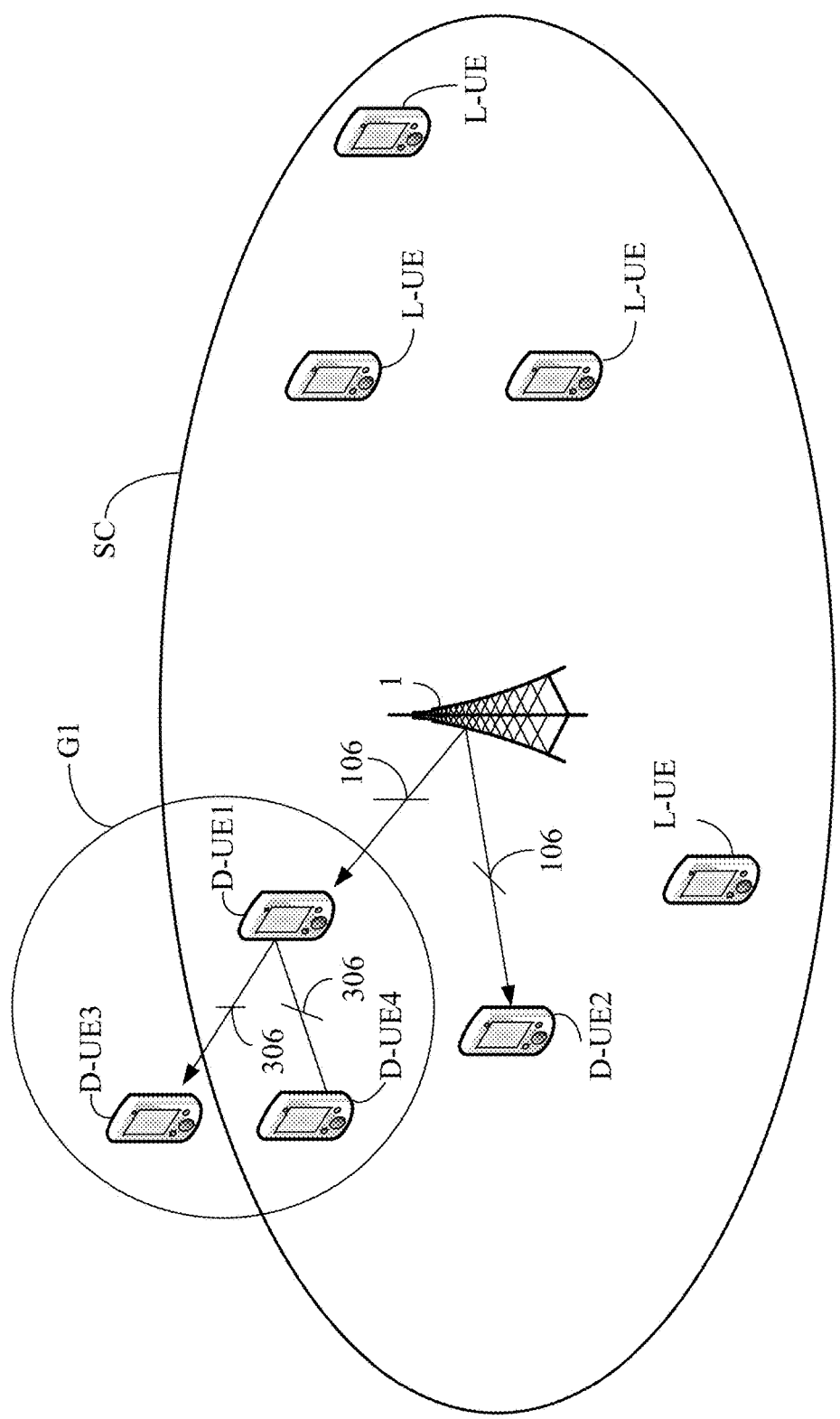

In a case depicted in FIG. 5D, D2D UEs D-UE1, D-UE2, D-UE4, D-UE5, D-UE6, and D-UE8 are located within the signal coverage SC of the base station 1, and the D2D UEs D-UE3, D-UE7, and D-UE9 are located outside of the signal coverage SC. In this case, the D2D UEs D-UE3, D-UE7, and D-UE9 have previously transmitted the resource request message to the base station 1 via the D2D UEs D-UE1, D-UE5, and D-UE8 respectively. The D2D group G1 comprises the D2D UEs D-UE1, D-UE3, and D-UE4, and the D2D group G2 comprises the D2D UEs D-UE5, D-UE6, and D-UE7.

Because there is a plurality of D2D UEs that need to transmit the resource request message to the base station 1 via other D2D UEs and receive the additional resource allocation information from these other D2D UEs in this case, the resource allocation information generated by the base station 1 further comprises scheduling information. The scheduling information indicates transmission priorities of these other D2D UEs for transmitting the additional resource allocation information via the allocation notification resource. The transmission priorities may be decided depending on identifications (IDs), distances from the base station 1, group codes or the like of the D2D UEs.

For example, a D2D UE acting as a coordinator and having a smaller group code transmits the additional resource allocation information firstly. Then, after all D2D UEs acting as coordinators in respective groups have transmitted additional resource allocation information in sequence via the allocation notification resource, D2D UEs not in any group but having smaller IDs then transmit the additional resource allocation information in sequence via the allocation notification resource. As shown in FIG. 5D, after receiving the resource allocation information 106, the D2D UE D-UE1 firstly transmits the additional resource allocation information 306 to the D2D UE D-UE3 via the allocation notification resource. Next, the D2D UE D-UE5 then transmits the additional resource allocation information 406 to the D2D UE D-UE7 via the allocation notification resource. Finally, the D2D UE D-UE8 then transmits the additional resource allocation information 506 to the D2D UE D-UE9 via the allocation notification resource.

In detail, in the D2D resource pool, the allocation notification resources may be distributed in some subframes (but not limited to this), so the D2D UEs may transmit respective additional resource allocation information in sequence via allocation notification resources of different subframes to avoid a collision that would otherwise be caused when transmissions of the respective additional resource allocation information are done via the same allocation notification resource at the same time. Additionally, in other embodiments, the D2D resource pool DRP may define a primary allocation notification resource and a secondary allocation notification resource. The primary allocation notification resource is for use by the base station 1 to transmit the resource allocation information, and the secondary allocation notification resource is for use by a D2D UE to transmit the additional allocation notification resource.

Differing from the cases depicted in FIGS. 5A~5D, FIGS. 5E~5H depict cases where the base station 1 transmits the resource allocation information 106 to the D2D UE D-UE1 by multicast via the transmission request resource. In other words, besides transmitting the resource allocation information 106 by broadcast, the base station 1 may also transmit the resource allocation information 106 to the D2D UE(s), the base station receives the resource request message(s) from which, by unicast or multicast. It should be appreciated that, the D2D UE may also transmit the additional allocation notification resource by unicast, multicast or broadcast.

Figure 5H:
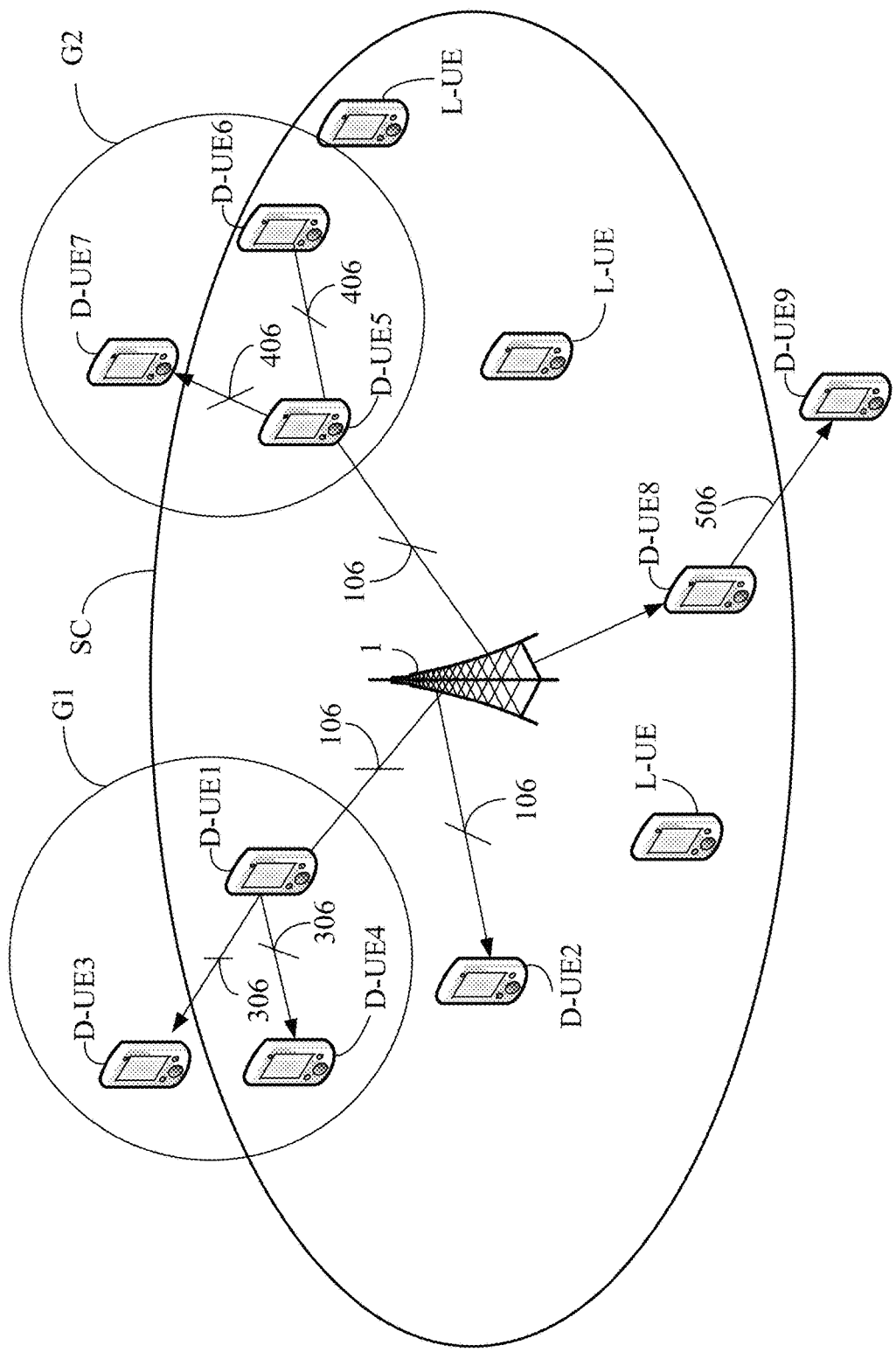
Figure 6A:
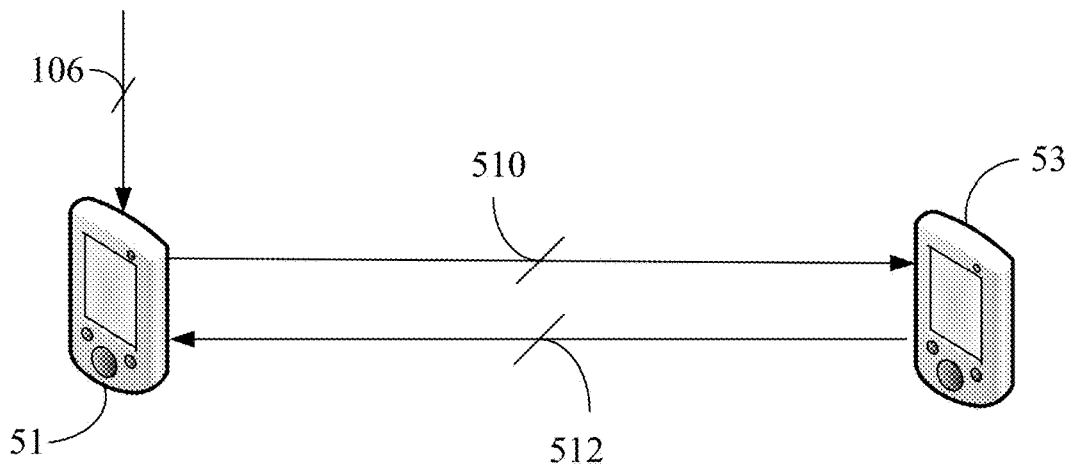
FIGS. 6A~6B respectively depict examples in which a handshake procedure is performed between D2D UEs according to a fifth embodiment of the present invention.

Please refer to FIGS. 5A~5H and FIGS. 6A~6B for a sixth embodiment of the present invention. As shown in FIG. 6A, after receiving the resource allocation information 106, a first D2D UE 51 may transmit a D2D hybrid access request 510 to a second D2D UE 53 via an allocated resource block set of the D2D resource block sets according to the resource allocation information 106. After receiving the D2D hybrid access request 510, the second D2D UE 53 transmits a D2D hybrid access response 512 to the first D2D UE 51 via the allocated resource block set. In this way, the first D2D UE 51 performs a D2D data transmission with the second D2D UE 53 according to D2D data transmission information in the D2D hybrid access response 512. In FIG. 6A, the first D2D UE 51 may be the D2D UE D-UE1 shown in FIG. 5A and FIG. 5E, and the second D2D UE 53 may be the D2D UE D-UE2 shown in FIG. 5A and FIG. 5E.

In detail, the D2D data transmission information in the D2D hybrid access response 512 indicates a resource index of a bidirectional transmission between the first D2D UE 51 and the second D2D UE 53 (i.e., a start position of sub-resource blocks in the allocated resource block set). Accordingly, the first D2D UE 51 performs the D2D data transmission with the second D2D UE 53 according to the D2D data transmission information in the D2D hybrid access response 512.

In another embodiment, the D2D hybrid access response 512 may further carry a power control message. The second D2D UE 53 may generate the power control message according to the receiving signal strength of the received D2D hybrid access request 510, and load the power control message into the D2D hybrid access response 512 to indicate the transmission power needed when the first D2D UE 51 performs the D2D data transmission. In this way, when the signal strength of the D2D hybrid access request 510 received by the second D2D UE 53 is lower than a threshold, it means that the communication quality between the first D2D UE 51 and the second D2D UE 53 is less preferred, and in this case, the power control message may instruct the first D2D UE 51 to perform the data transmission at a greater transmission power; and on the contrary, when the signal strength of the D2D hybrid access request 510 received by the second D2D UE 53 is higher than the threshold, it means that the communication quality between the first D2D UE 51 and the second D2D UE 53 is good at this moment, and in this case, the power control message instructs the first D2D UE 51 to appropriately adjust the transmission power for performing the data transmission so as to decrease the signal interference on other UEs and also to decrease the power consumption of the first D2D UE 51.

Figure 6B:
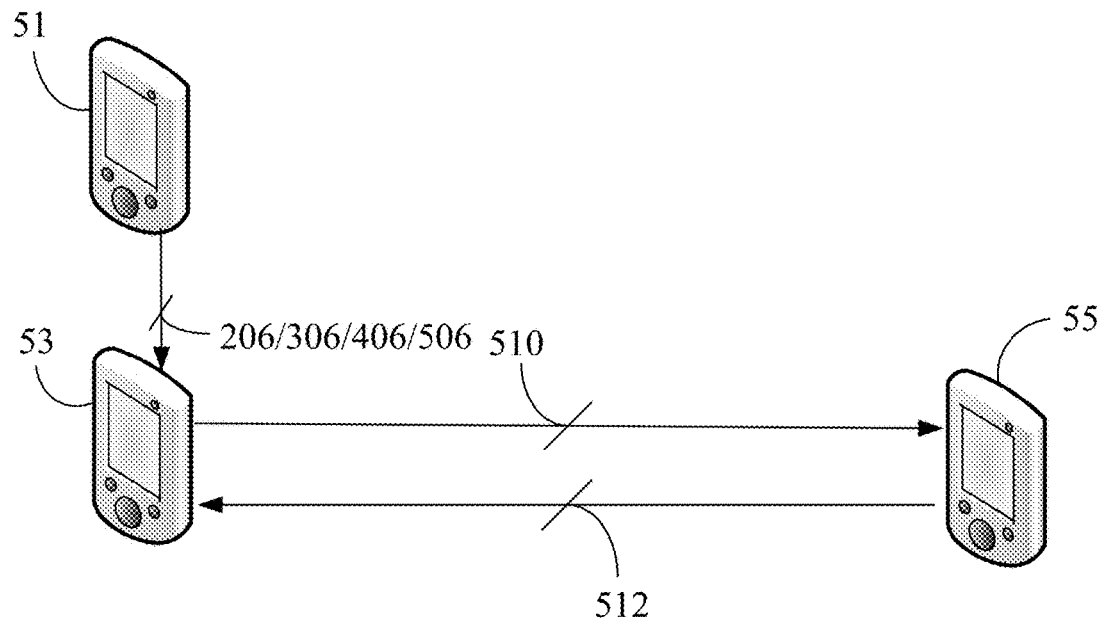

On the other hand, as shown in FIG. 6B, the first D2D UE 51 receives the resource allocation information 106. The resource allocation information comprises scheduling information, and the scheduling information indicates a transmission priority of each D2D UE. Then, the first D2D UE 51 transmits additional resource allocation information 206/306/406/506 to the second D2D UE 53 according to its transmission priority. The second D2D UE 53 transmits a D2D hybrid access request 510 to a third D2D UE 55 via an allocated resource block set of the D2D resource block sets. Afterwards, after receiving the D2D hybrid access request 510, the third D2D UE 55 transmits the D2D hybrid access response 512 to the second D2D UE 53 via the allocated resource block set. In this way, the second D2D UE 53 performs a D2D data transmission with the third D2D UE 55 according to the D2D data transmission information in the D2D hybrid access response 512.

Likewise, the D2D data transmission information in the D2D hybrid access response 512 indicates a resource index of a bidirectional transmission between the second D2D UE 53 and the third D2D UE 55 (i.e., a start position of sub-resource blocks in the allocated resource block set). Accordingly, the second D2D UE 53 can perform the D2D data transmission with the third D2D UE 55 according to the D2D data transmission information in the D2D hybrid access response 512.

In FIG. 6B, the first D2D UE 51 may be the D2D UE D-UE1 shown in FIGS. 5B~5D and FIGS. 5F~5H, or the D2D UE D-UE1 or the D2D UE D-UE5 shown in FIG. 5D and FIG. 5H. When the first D2D UE 51 is the D2D UE D-UE1, the second D2D UE 53 may be the D2D UE D-UE3 and the third D2D UE 55 may be the D2D UE D-UE4. Furthermore, when the first D2D UE 51 is the D2D UE D-UE5, the second D2D UE 53 may be the D2D UE D-UE7 and the third D2D UE 55 may be the D2D UE D-UE6. Additionally, when the first D2D UE 51 is the D2D UE D-UE8, the second D2D UE 53 may be the D2D UE D-UE9 and the third D2D UE 55 may also be the D2D UE D-UE8.

Likewise, the D2D data transmission information in the D2D hybrid access response 512 indicates a resource index of a bidirectional transmission between the second D2D UE 53 and the third D2D UE 55 (i.e., a start position of sub-resource blocks in the allocated resource block set). Accordingly, the second D2D UE 53 can perform the D2D data transmission with the third D2D UE 55 according to the D2D data transmission information in the D2D hybrid access response 512.

It should be appreciated that, in some cases, the first D2D UE 51 that has transmitted the additional resource allocation information 206/306/406/506 to the second D2D UE 53 may also receive the D2D hybrid access request 510 from the second D2D UE 53 and transmit the D2D hybrid access response 512 to the second D2D UE 53 to perform a D2D data transmission with the second D2D UE 53. From the above description, people of ordinary skill in the art shall readily understand that any two D2D UEs that desire to perform the D2D data transmission therebetween need to complete a D2D handshake procedure (i.e., to transmission of the D2D hybrid access request 510 and the D2D hybrid access response 512) via the allocated resource block set.

Similarly in another embodiment, the D2D hybrid access response 512 may further carry a power control message. The third D2D UE 55 may generate the power control message according to the receiving signal strength of the D2D hybrid access request 510 that is received, and load the power control message into the D2D hybrid access response 512 to indicate the transmission power needed when the second D2D UE 53 performs the D2D data transmission. In this way, when the signal strength of the D2D hybrid access request 510 received by the third D2D UE 55 is lower than a threshold, it means that the communication quality between the second D2D UE 53 and the third D2D UE 55 is less preferred, and in this case, the power control message may instruct the second D2D UE 53 to transmit the data at a greater transmission power; and on the contrary, when the signal strength of the D2D hybrid access request 510 received by the third D2D UE 55 is higher than the threshold, it means that the communication quality between the second D2D UE 53 and the third D2D UE 55 is good at this moment, and in this case, the power control message instructs the second D2D UE 53 to appropriately adjust the transmission power for performing the data transmission so as to decrease the signal interference on other UEs and also to decrease the power consumption of the second D2D UE 53.

Figure 7:
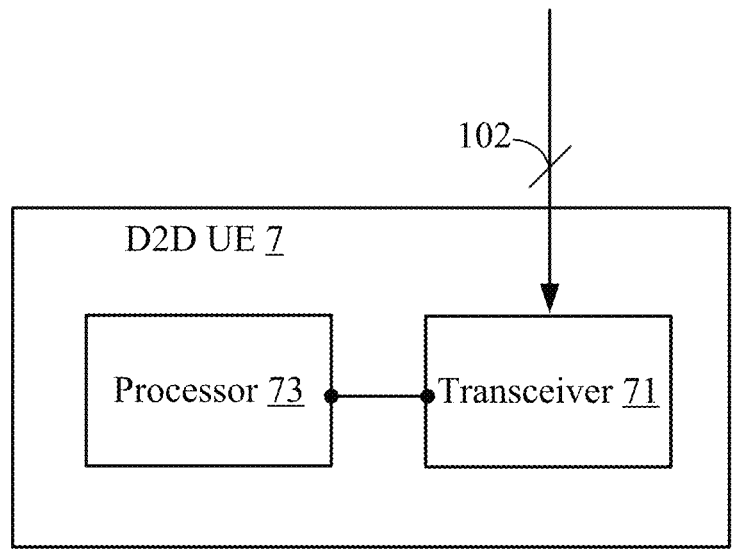
FIG. 7 is a schematic view of a D2D UE 7 according to a seventh embodiment of the present invention.

Please refer to FIG. 7 for a seventh embodiment. FIG. 7 is a schematic view of a D2D UE 7 of the present invention. The D2D UE 7 comprises a transceiver 71 and a processor 73. The processor 73 is electrically connected to the transceiver 71. In this embodiment, the D2D UE 7 may be the D2D UEs D-UE1, D-UE2, or D-UE4 shown in FIGS. 3A~3C. The transceiver 71 receives the resource configuration information 102. The processor 73 parses the resource configuration information 102 to learn the D2D resource pool DRP.

As described in the previous embodiments, in a practical example, the D2D UEs D-UE1, D-UE2, and D-UE4 may transmit a measurement report message to the base station 1 so that the base station 1 generates the signal quality information according to the measurement report message. In this case, the transceiver 71 further transmits the measurement report message to the base station 1. Additionally, in another practical example, the base station generates the signal quality information according to signal properties of the D2D UEs D-UE1, D-UE2, D-UE4 and at least one cellular UE L-UE in a connection procedure. Furthermore, as described in the previous embodiments, the resource pool RP may define a downlink resource, and the downlink resource may include a broadcast resource so that the resource configuration information 102 can be carried in the broadcast resource.

Figure 8:
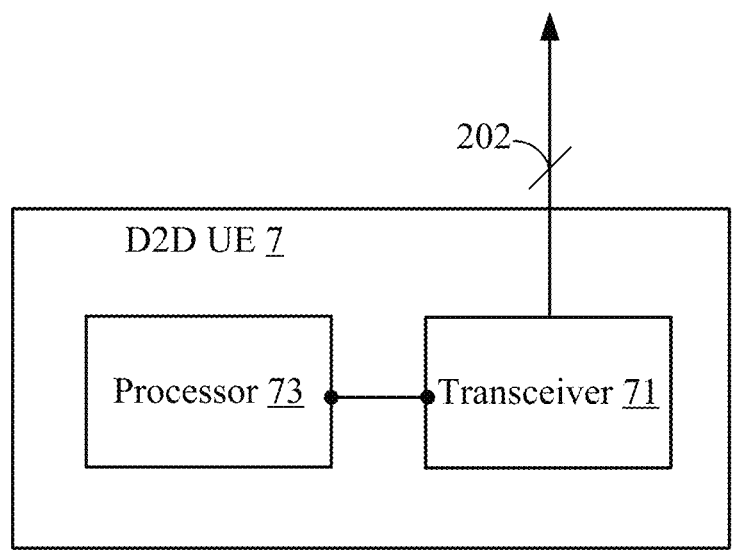
FIG. 8 is a schematic view of the D2D UE 7 of according to eighth embodiment of the present invention.

Please refer to FIG. 8 for an eighth embodiment of the present invention. In this embodiment, the D2D UE 7 may be the D2D UE D-UE1 shown in FIGS. 3B~3C. The processor 73 parses the resource configuration information 102 to learn the D2D resource pool DRP. The resource pool RP defines an uplink resource, and the uplink resource comprises a D2D broadcast resource. Afterwards, the processor 73 further generates additional resource configuration information 202 according to the resource configuration information 102. The transceiver 71 further transmits the additional resource configuration information 202 to another D2D UE (e.g., the D2D UE D-UE3 in FIGS. 3B~3C) via the D2D broadcast resource.

Figure 9:
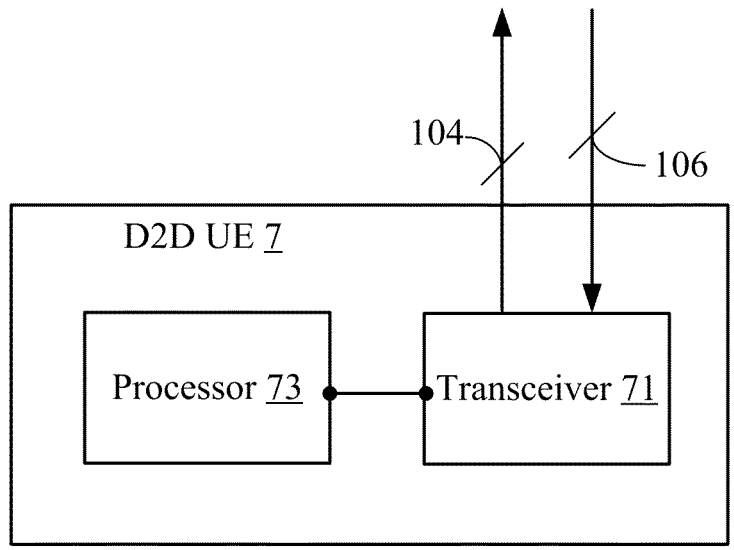
FIG. 9 is a schematic view of the D2D UE 7 according to a ninth embodiment of the present invention.

Please refer to FIG. 9 for a ninth embodiment of the present invention. In this embodiment, the D2D UE 7 may be the D2D UEs D-UE1, D-UE2 or D-UE4 shown in FIGS. 4A~4C or the D2D UEs D-UE1, D-UE2, D-UE4, D-UE5, D-UE6 or D-UE8 shown in FIGS. 5A~5F. As described in the previous embodiment, the D2D resource pool may define a transmission request resource and an allocation notification resource. When the D2D UE 7 has a demand for D2D data transmission (e.g., the D2D UE D-UE1 in FIG. 4A), the processor 73 may generate the resource request message 104 according to the resource configuration information 102. The transceiver 71 transmits the resource request message 104 to the base station 1 via the transmission request resource so that the base station 1 divides the D2D resource blocks into a plurality of D2D resource block sets according to the resource request message 104 and generates resource allocation information 106 to indicate the D2D resource block sets. Additionally, the transceiver 71 further receives the resource allocation information 106 from the base station 1 via the allocation notification resource.

On the other hand, the D2D UE 7 may be a first D2D UE (e.g., the D2D UE D-UE1 in FIGS. 4B~4C, or the D2D UE D-UE1 in FIGS. 5B~5D and FIGS. 5F~8H). In this case, the transceiver 71 receives the resource request message 104 from a second UE (e.g., the D2D UE D-UE3 in FIGS. 4B~4C or the D2D UE D-UE3 in FIGS. 5B~5D and FIGS. 5F~8H) via the transmission request resource. Next, the transceiver 71 further transmits the resource request message 104 to the base station 1 via the transmission request resource.

Figure 10:
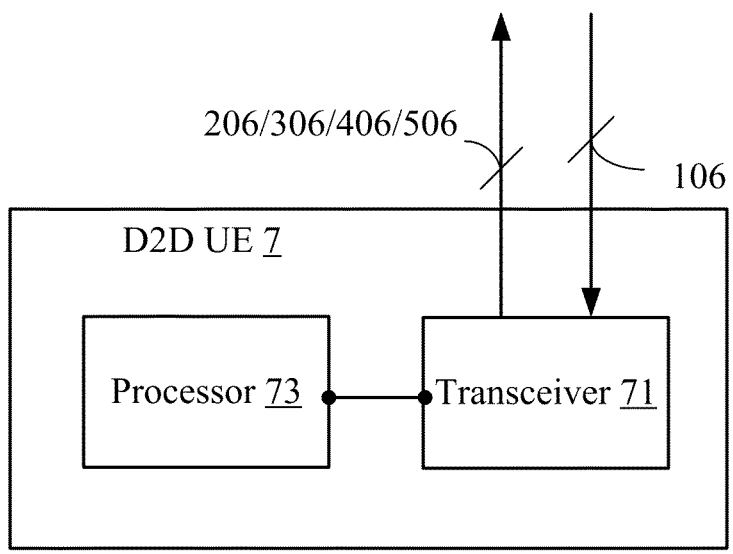
FIG. 10 is a schematic view of the D2D UE 7 according to a tenth embodiment of the present invention.

Please refer to FIG. 10 for a tenth embodiment of the present invention. In this embodiment, the D2D UE 7 may be the D2D UE D-UE1, D-UE5, or D-UE8 shown in FIGS. 5B~5D and FIGS. 5F~8H or the D2D UE 51 (which is a first D2D UE) shown in FIG. 6B. The transceiver 71 receives the resource allocation information 106 from the base station 1 via the allocation notification resource. Afterwards, the processor 71 generates additional resource allocation information 206/306/406/506, and transmits the additional resource allocation information 206/306/406/506 to the second D2D UE (e.g., the D2D UE D-UE3, D-UE7 or D-UE9 in FIGS. 5B~5D and FIGS. 5F~8H or the D2D UE 53 in FIG. 6B) via the allocation notification resource.

As described in the previous embodiments, the resource allocation information may include scheduling information which indicates a transmission priority of each D2D UE. In this case, after generating the additional resource allocation information 206/306/406/506 according to the resource allocation information 106, the processor 73 transmits the additional resource allocation information 206/306/406/506 to the second D2D UE via the allocation notification resource according to its transmission priority. Accordingly, the additional resource allocation information 206/306/406/506 is used for the second D2D UE to transmit a D2D hybrid access request 510 to a third D2D UE (e.g., the D2D UE 55 in FIG. 6B) via an allocated resource block set of the D2D resource block sets, and for the third D2D UE to transmit a D2D hybrid access response 512 to the second D2D UE via the allocated resource block set after receiving the D2D hybrid access request 510 so that the second D2D UE performs a D2D data transmission with the third D2D UE according to the D2D data transmission information in the D2D hybrid access response 512.

Figure 11:
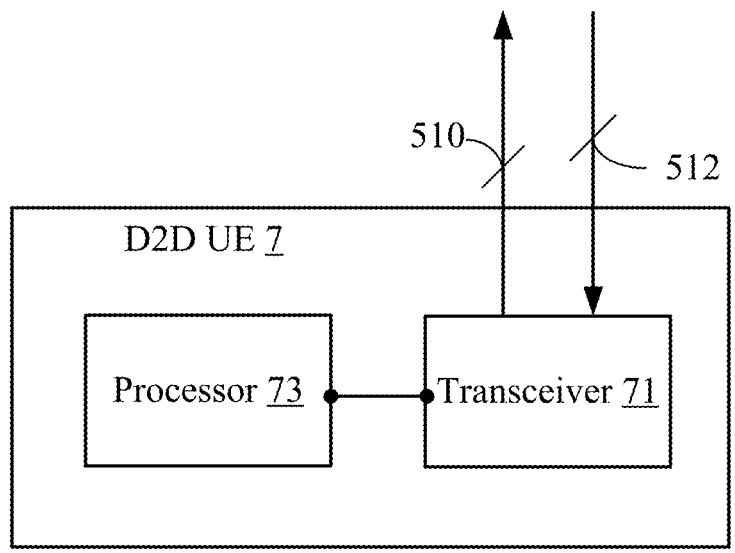
FIG. 11 is a schematic view of the D2D UE 7 according to an eleventh embodiment and a fourteenth embodiment of the present invention.

Please refer to FIG. 11 for an eleventh embodiment of the present invention. In this embodiment, the D2D UE 7 may be the D2D UE 51 shown in FIG. 6A. The processor 73 generates the D2D hybrid access request 510 after the transceiver 71 has received the resource allocation information 106. Then, the transceiver 71 transmits the D2D hybrid access request 510 to another D2D UE (e.g., the D2D UE 53 in FIG. 6A) via an allocated resource block set of the D2D resource block sets. Next, the transceiver 71 receives a D2D hybrid access response 512 from the another D2D UE. In this way, the D2D UE 7 can perform the D2D data transmission with the another D2D UE according to the D2D data transmission information in the D2D hybrid access response 512.

Figure 12:
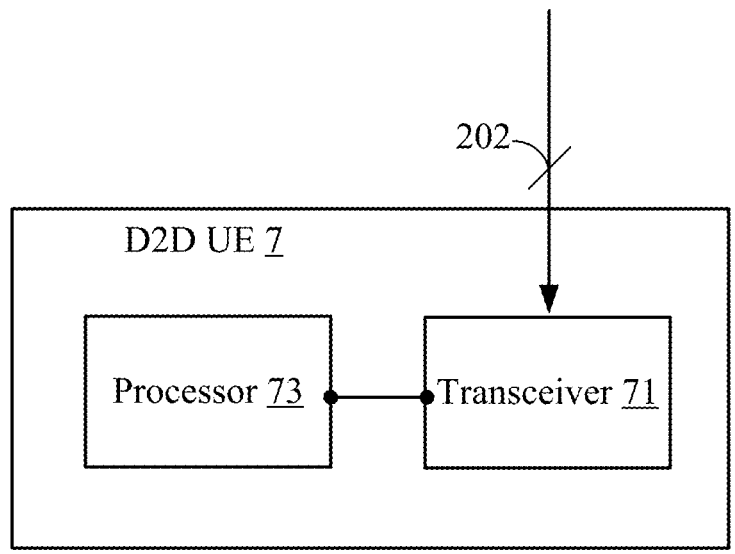
FIG. 12 is a schematic view of the D2D UE 7 according to a twelfth embodiment of the present invention.

Please refer to FIG. 12 for a twelfth embodiment of the present invention. In this embodiment, the D2D UE 7 may be the D2D UE D-UE3 shown in FIGS. 3B~3C. The transceiver 71 receives additional resource configuration information 202 from the first D2D UE (e.g., the D2D UE D-UE1 in FIGS. 3B~3C) via the D2D broadcast resource. As described in the previous embodiments, the additional resource configuration information is generated by the first D2D UE according to resource configuration information 102. The resource configuration information 102 indicates the D2D resource pool DRP, and the D2D resource pool DRP is formed by a base station 1 through choosing a plurality of resource blocks from the resource pool RP according to at least one of signal quality information and traffic loading information. The resource configuration information 102 is generated by the base station 1 according to the D2D resource pool DRP. The processor 73 parses the additional resource configuration information 202 to learn the D2D resource pool DRP.

Figure 13:
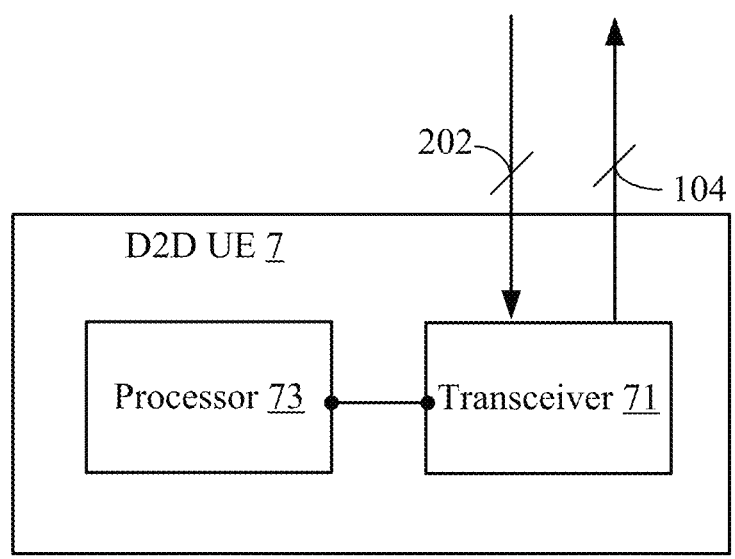
FIG. 13 is a schematic view of the D2D UE 7 according to a thirteenth embodiment of the present invention.

Please refer to FIG. 13 for a thirteenth embodiment of the present invention. In this embodiment, the D2D UE 7 may be the D2D UE D-UE3 shown in FIGS. 4B~4C or the D2D UE D-UE3, D-UE7 or D-UE9 shown in FIGS. 5B~5D and FIGS. 5F~5H. The processor 73 parses the additional resource configuration information 202 to learn the D2D resource pool DRP. As described in the previous embodiments, the D2D resource pool DRP may be defined to include a transmission request resource and an allocation notification resource. In this case, the processor 73 generates the resource request message 104. Then, the transceiver 71 transmits the resource request message 104 to the first D2D UE (e.g., the D2D UE D-UE1 in FIGS. 4B~4C) via the transmission request resource so that the first D2D UE relays the resource request message 104 to the base station 1 via the transmission request resource. Then, the base station 1 divides the resource blocks into a plurality of D2D resource block sets according to the resource request message 104 and generates resource allocation information 106 to indicate the D2D resource block sets.

Afterwards, the base station 1 transmits the resource allocation information 106 to the first D2D UE via the allocation notification resource. Then, the transceiver 71 further receives the additional resource allocation information 206/306/406/506 from the first D2D UE (e.g., the D2D UE D-UE1, D-UE5 or D-UE8 in FIGS. 5B~5D and FIGS. 5F~8H) via the allocation notification resource.

Please refer to FIG. 11 for a fourteenth embodiment of the present invention. In this embodiment, the D2D UE 7, which is a second UE, may be the D2D UE 53 shown in FIG. 6B. The processor 73 generates the D2D hybrid access request 510 after the transceiver 71 has received the additional resource allocation information 206/306/406/506 from a first D2D UE (e.g., the D2D UE 51 in FIG. 6B). Then, the transceiver 71 transmits the D2D hybrid access request 510 to a third D2D UE (e.g., the D2D UE 55 in FIG. 6B) via an allocated resource block set of the D2D resource block sets. Next, the transceiver 71 receives the D2D hybrid access response 512 from the third D2D UE. In this way, the D2D UE 7 can perform a D2D data transmission with the third D2D UE according to the D2D data transmission information in the D2D hybrid access response 512.

According to the above descriptions, by the resource allocation mechanism of the present invention, a base station can dynamically allocate appropriate resources from the resource pool of the existing 3GPP LTE communication system according to at least one of signal quality information and traffic loading information to allow for a direct communication between the UEs. Additionally, the base station of the present invention may also choose specific resource blocks from the resource pool of the existing 3GPP LTE communication system to provide the specific resource blocks to D2D UEs used in special cases (e.g., in emergency situations). On the other hand, the resource allocation mechanism of the present invention allows a D2D UE located outside of the signal coverage of the base station to perform a D2D data transmission with other D2D UEs, and also allows the D2D UEs located within signal coverages of different base stations to perform a D2D data transmission therebetween. Accordingly, the resource allocation mechanism of the present invention can extend the resources of the existing 3GPP LTE communication system to the Public safety Network, and allows the D2D UEs to perform a direct communication therebetween without affecting signal transmissions of the original 3GPP LTE network.

The above disclosure is related to the detailed technical contents and inventive features thereof. People skilled in this field may proceed with a variety of modifications and replacements based on the disclosures and suggestions of the invention as described without departing from the charac- teristics thereof. Nevertheless, although such modifications and replacements are not fully disclosed in the above descriptions, they have substantially been covered in the following claims as appended.

What is claimed is:

1. A base station for a wireless communication system, the wireless communication system defining a resource pool, the base station comprising:
   a storage, being configured to store signal quality information and traffic loading information;
   a processor electrically connected to the storage, being configured to choose a plurality of resource blocks to form a device to device (D2D) resource pool according to at least one of the signal quality information and the traffic loading information, and generate resource configuration information according to the D2D resource pool, wherein the resource configuration information indicates the D2D resource pool; and
   a transceiver electrically connected to the processor, being configured to transmit the resource configuration information;
   wherein the D2D resource pool defines a transmission request resource and an allocation notification resource, the transceiver receives at least one resource request message from at least one D2D user equipment (UE) via the transmission request resource, the processor divides the D2D resource pool into a plurality of D2D resource block sets according to the at least one resource request message and generates resource allocation information to indicate the D2D resource block sets, and the transceiver further transmits the resource allocation information to the at least one D2D UE via the allocation notification resource;
   wherein the at least one D2D UE includes a first D2D UE, and the resource allocation information is used for the first D2D UE to transmit a D2D hybrid access request to a second D2D UE via an allocated resource block set of the D2D resource block sets and for the second D2D UE to transmit a D2D hybrid access response to the first D2D UE via the allocated resource block set after receiving the D2D hybrid access request so that the first D2D UE performs a D2D data transmission with the second D2D UE according to D2D data transmission information in the D2D hybrid access response.

2. The base station of claim 1, wherein the transceiver receives a measurement report message from the at least one D2D UE, and the processor generates the signal quality information according to the measurement report message and stores the signal quality information into the storage.

3. The base station of claim 1, wherein the processor generates the signal quality information according to a signal property of the at least one D2D UE and at least one cellular UE in a connection procedure, and stores the signal quality information into the storage.

4. The base station of claim 1, wherein the resource pool defines a downlink resource, and the resource configuration information is carried in a broadcast resource of the downlink resource.

5. The base station of claim 1, wherein the at least one D2D UE includes another first D2D UE, the resource allocation information comprises scheduling information, and the scheduling information indicates a transmission priority so that the another first D2D UE transmits additional resource allocation information to another second D2D UE according to the transmission priority.

6. The base station of claim 5, wherein the additional resource allocation information is used for the another second D2D UE to transmit a D2D hybrid access request to a third D2D UE via an allocated resource block set of the D2D resource block sets and for the third D2D UE to transmit a D2D hybrid access response to the another second D2D UE via the allocated resource block set after receiving the D2D hybrid access request transmitted from the another second D2D UE so that the another second D2D UE performs a D2D data transmission with the third D2D UE according to D2D data transmission information in the D2D hybrid access response.

7. The base station of claim 1, wherein the processor further defines a dynamic resource block set and at least one fixed resource block set in the D2D resource pool.

8. The base station of claim 1, wherein the processor further defines a plurality of group resource block sets in the D2D resource pool.

9. The base station of claim 1, wherein the base station further performs a negotiation procedure with a neighboring base station via a backhaul network, and the processor further chooses the resource blocks from the resource pool according to the negotiation procedure to form the D2D resource pool.

10. The base station of claim 9, wherein the resource blocks in the D2D resource pool of the base station are at least partially identical to a plurality of resource blocks in a D2D resource pool of the neighboring base station.

11. A device to device (D2D) user equipment (UE) for a wireless communication system, the wireless communication system defining a resource pool, the D2D UE comprising:
- a transceiver, being configured to receive resource configuration information, wherein the resource configuration information indicates a D2D resource pool, the D2D resource pool is formed by a base station through choosing a plurality of resource blocks from the resource pool according to at least one of signal quality information and traffic loading information, and the resource configuration information is generated by the base station according to the D2D resource pool; and
- a processor electrically connected to the transceiver, being configured to parse the resource configuration information to learn the D2D resource pool;
- wherein the D2D resource pool further defines a transmission request resource and an allocation notification resource, the transceiver transmits a resource request message to the base station via the transmission request resource so that the base station divides the D2D resource pool into a plurality of D2D resource block sets according to the resource request message and generates resource allocation information to indicate the D2D resource block sets, and the transceiver further receives the resource allocation information from the base station via the allocation notification resource;
- wherein the processor further generates a D2D hybrid access request, and the transceiver further transmits the D2D hybrid access request to another D2D UE via an allocated resource block set of the D2D resource block sets and receives a D2D hybrid access response from the another D2D UE so that the D2D UE performs a D2D data transmission with the another D2D UE according to D2D data transmission information in the D2D hybrid access response.

12. The D2D UE of claim 11, wherein the transceiver further transmits a measurement report message to the base station so that the base station generates the signal quality information according to the measurement report message.

13. The D2D UE of claim 11, wherein the base station generates the signal quality information according to a signal property of the D2D UE and at least one cellular UE in a connection procedure.

14. The D2D UE of claim 11, wherein the resource pool defines a downlink resource including a broadcast resource, and the resource configuration information is carried in the broadcast resource.

15. The D2D UE of claim 11, wherein the resource pool further defines an uplink resource including a D2D broadcast resource, the processor further generates additional resource configuration information according to the resource configuration information, and the transceiver further transmits the additional resource configuration information to another D2D UE located outside of a signal coverage of the base station via the D2D broadcast resource.

16. The D2D UE of claim 11, wherein the D2D UE is a first D2D UE, the transceiver receives the resource request message from a second D2D UE via the transmission request resource, the resource allocation information comprises scheduling information, the scheduling information indicates a transmission priority, and the processor further generates additional resource allocation information according to the resource allocation information, transmits the additional resource allocation information to the second D2D UE according to the transmission priority and via the allocation notification resource so that the second D2D UE transmits a D2D hybrid access request to a third D2D UE via an allocated resource block set of the D2D resource block sets, and the third D2D UE transmits a D2D hybrid access response to the second D2D UE via the allocated resource block set after receiving the D2D hybrid access request, whereby the second D2D UE performs a D2D data transmission with the third D2D UE according to D2D data transmission information in the D2D hybrid access response.

17. The D2D UE of claim 11, wherein the D2D resource pool comprises a dynamic resource block set and at least one fixed resource block set.

18. The D2D UE of claim 11, wherein the D2D resource pool comprises a plurality of group resource block sets.

19. A device to device (D2D) user equipment (UE) for a wireless communication system, the wireless communication system defining a resource pool, the resource pool defining an uplink resource, the uplink resource comprises a D2D broadcast resource, the D2D UE comprising:
- a transceiver, being configured to receive additional resource configuration information from a first D2D UE via the D2D broadcast resource, wherein the additional resource configuration information is generated by the first D2D UE according to resource configuration information, the resource configuration information indicates a D2D resource pool, the D2D resource pool is formed by a base station through choosing a plurality of resource blocks from the resource pool according to at least one of signal quality information and traffic loading information, and the resource configuration information is generated by the base station according to the D2D resource pool and is transmitted to the first D2D UE via the D2D broadcast resource; and
- a processor electrically connected to the transceiver, being configured to parse the additional resource configuration information to learn the D2D resource pool;
- wherein the D2D resource pool defines a transmission request resource and an allocation notification resource, the processor further generates a resource request message, the transceiver further transmits the resource request message to the first D2D UE via the transmission request resource so that the first D2D UE relays the resource request message to the base station via the transmission request resource and the base station divides the resource blocks into a plurality of D2D resource block sets according to the resource request message and generates resource allocation information to indicate the D2D resource block sets, the base station further transmits the resource allocation information to the first D2D UE via the allocation notification resource, the first D2D UE further generates additional resource allocation information according to the resource allocation information, and the transceiver further receives the additional resource allocation information from the first D2D UE via the allocation notification resource;

wherein the D2D UE is a second D2D UE, the processor further generates a D2D hybrid access request, and the transceiver further transmits the D2D hybrid access request to a third D2D UE via an allocated resource block set of the D2D resource block sets, and receives a D2D hybrid access response from the third D2D UE so that the D2D UE performs a D2D data transmission with the third D2D UE according to D2D data transmission information in the D2D hybrid access response.

20. The D2D UE of claim 19, wherein the D2D resource pool comprises a dynamic resource block set and at least one fixed resource block set.

21. The D2D UE of claim 19, wherein the D2D resource pool comprises a plurality of group resource block sets.

* * * * *